United States Patent
Watabiki et al.

(10) Patent No.: US 6,693,245 B2
(45) Date of Patent: Feb. 17, 2004

(54) ELECTRONIC BALANCE WHICH IS EASILY ASSEMBLED, MAINTAINED, DOWNSIZED AND IMPROVED WITH RESPECT TO WEIGHING PERFORMANCE, AND METHOD FOR MANUFACTURING THE SAME

(75) Inventors: Hiroaki Watabiki, Atsugi (JP); Norikazu Murata, Atsugi (JP); Akio Sakai, Hadano (JP)

(73) Assignee: Anritsu Corporation, Tokyo (JP)

( * ) Notice: Subject to any disclaimer, the term of this patent is extended or adjusted under 35 U.S.C. 154(b) by 211 days.

(21) Appl. No.: 09/957,847

(22) Filed: Sep. 21, 2001

(65) Prior Publication Data

US 2002/0038729 A1 Apr. 4, 2002

(30) Foreign Application Priority Data

Sep. 29, 2000 (JP) .......................... 2000-299601
Sep. 29, 2000 (JP) .......................... 2000-299602
Sep. 29, 2000 (JP) .......................... 2000-299603

(51) Int. Cl.⁷ .............................. G01G 7/00; G01G 3/08
(52) U.S. Cl. .............................. 177/210 EM; 177/212; 177/229; 29/593
(58) Field of Search ..................... 177/229, 210 EM, 177/212; 29/593

(56) References Cited

U.S. PATENT DOCUMENTS

| | | | | |
|---|---|---|---|---|
| 3,722,737 A | * | 3/1973 | Hughes et al. | 206/187 |
| 4,343,373 A | * | 8/1982 | Stadler et al. | 177/212 |
| 4,509,610 A | * | 4/1985 | Hayashi | 177/229 |
| 4,713,861 A | * | 12/1987 | Bancroft | 16/222 |
| 4,722,409 A | * | 2/1988 | Kunz | 177/212 |
| 4,798,251 A | * | 1/1989 | Maaz et al. | 177/229 |
| 4,799,561 A | | 1/1989 | Komoto | 177/229 |
| 5,315,073 A | | 5/1994 | Ast et al. | 177/212 |
| 5,340,951 A | | 8/1994 | Hungerbühler et al. | 177/229 |
| 5,771,986 A | * | 6/1998 | K+e,uml +ee ohn et al. | 177/210 EM |
| 6,458,513 B1 | * | 10/2002 | Yu et al. | 430/313 |

FOREIGN PATENT DOCUMENTS

| | | |
|---|---|---|
| DE | 43 05 425 A1 | 8/1994 |
| EP | 0076616 A2 | 4/1983 |
| EP | 0555876 A1 | 8/1993 |
| JP | 11-51756 A | 2/1999 |

* cited by examiner

*Primary Examiner*—Randy Gibson
(74) *Attorney, Agent, or Firm*—Frishauf, Holtz, Goodman & Chick, P.C.

(57) ABSTRACT

A Roberval's mechanism and a lever are configured separately. To the Roberval's mechanism, a lever housing section is formed for inserting the lever in the longitudinal direction and enabling the lever to be located between a pair of the upper and the lower Roberval's sections. To the other end of the lever, a section extending outwards beyond the lever housing section is equipped. A balance driving portion are mounted to the section equipped to the other end of the lever and extending outwards.

The lever block is situated to extend through a hollowed out section of the fixed end of the Roberval load block. During manufacture, the lever is formed from a separate piece that has temporary bridges formed to maintain the fixed section and the mobile sections relatively immobile so that the spring sections are protected during assembly. After the lever is connected to the Roberval mechanism, the bridges are cut.

14 Claims, 20 Drawing Sheets

ELECTRONIC BALANCE WHICH IS EASILY ASSEMBLED, MAINTAINED, DOWNSIZED AND IMPROVED WITH RESPECT TO WEIGHING PERFORMANCE, AND METHOD FOR MANUFACTURING THE SAME

CROSS-REFERENCE TO RELATED APPLICATIONS

This application is based upon claims the benefit of priority from the prior Japanese Patent Applications No. 2000-299601, filed Sep. 29, 2000; No. 2000-299602 filed Sep. 29, 2000; and No. 2000-299603 filed Sep. 29, 2000, the entire contents of all of which are incorporated herein by reference.

BACKGROUND OF THE INVENTION

1. Field of the Invention

The present invention relates to an electronic balance for measuring the mass of the substance to be weighed and more specifically, to an electronic balance that is easy to assemble and maintain, and that can be downsized, and in addition to this, an electronic balance with an improved lever that moves from the balancing state during load application, and furthermore, an electronic balance that enables the protection of the spring section of the Roberval's mechanism by improving the mobile range of the Roberval's mechanism which composes the electronic balance.

2. Description of the Related Art

Hitherto, for this kind of electronic balance, "ELECTRONIC BALANCE" disclosed in the U.S. Pat. No. 4,799,561 is well known.

FIG. 23 is a front cross-sectional view showing the "ELECTRONIC BALANCE" disclosed in the U.S. Pat. No. 4,799,561 as the first conventional electronic balance 80.

FIG. 24 is a perspective view showing to remove the scale plate 89 from FIG. 23.

That is, as shown in FIGS. 23 and 24, the first electronic balance 80 generally comprises a Roberval's mechanism 81 in which the mobile section 81b with the scale plate 89 provided moves with respect to the fixed section 81a, a lever 83 that operates in linkage with the transfer of the mobile section 81b, an electromagnetic coil 85 that moves and controls the lever 83 to be in the balancing state, a position detection sensor (not illustrated) for detecting the balancing state of the lever 83, and a control section that energizes and controls the electromagnetic coil 85 to calculate and output the mass of the substance to be weighed.

Now the Roberval's mechanism 81 has a pair of upper and lower parallel Roberval's sections 86 formed by hollowing out a metal block such as rectangular aluminum, etc. from the one side to a specified shape as illustrated.

In this Roberval's section 86, a total of 4 thin-wall spring sections 87 are formed, and when a substance to be weighed is placed on a scale plate 89 of the mobile section 81b, the spring section 87 portion is deformed by receiving this load, and the mobile section 81b moves downwards with the level condition maintained by the mobile section 81b.

In linkage with the shift of this mobile section 81b, the free end 83a of the lever 83 displaces from the balancing position to upwards.

The control section energizes and controls the electromagnetic coil 85 so that the lever 83 is brought to the balancing state based on the output of the position detection sensor, and calculates and outputs the mass of the substance to be weighed in accordance with the current value, etc. to the electromagnetic coil 85 when the lever 83 is in the balancing state.

Hitherto, for this kind of electronic balance, "electronic weighing apparatus" disclosed in the Jpn. Pat. Appln. KOKAI Publication No. 11-51756 is well known.

FIG. 25 is an exploded perspective view of the principle section that shows the "electronic weighing apparatus" disclosed in the Jpn. Pat. Appln. KOKAI Publication No. 11-51756 as the conventional second electronic balance 90.

That is, as shown in FIG. 25, the second electronic balance 90 has the Roberval's mechanism 91 and the lever 92 separately formed.

Now, the lever 92 is installed in the form of linking both side sections of the Roberval's mechanism 91.

And this lever 92 is held between the Roberval's mechanism 91 and the base member 95 as shown with an illustrated broken line by a plurality of fulcrum member 93 and a suspension member 94.

The lever 83 in the configuration of the first electronic balance 80 is formed integral with the Roberval's mechanism 81, whereas in the second electronic balance 90, it is formed separately from the Roberval's mechanism 91, but both Roberval's mechanism 81 and Roberval's mechanism 91 are formed by hollowing a rectangular shape aluminum block, etc. from the one section to a specified profile as described above.

Hitherto, for this kind of electronic balance, the "DEVICE FOR REDUCING THE FORCE IN A FORCE-MEASURING APPARATUS, IN PARTICULAR IN A SCALE" disclosed in the U.S. Pat. No. 5,340,951 is well known.

FIG. 26 is a perspective view showing the "Device for Reducing the Force in a Force-measuring Apparatus, in Particular in a Scale" disclosed in the U.S. Pat. No. 4,350,951 as a third conventional electronic balance 100.

That is, as shown in FIG. 26, this third electronic balance 100 has the Roberval's mechanism 101 hollowed and formed from the one side section of a rectangular aluminum block, etc. and at the same time, a lever mounting section 102 is formed.

By mounting a separate lever 103 to this mount section 102, an electronic balance 100 is constructed.

Now, as shown in FIGS. 23 and 24, the lever 83 in the configuration of the first conventional electronic balance 80 is hollowed into a specified shape continuously in the width direction from the one section side of a rectangular aluminum block material, etc.

Consequently, in the first conventional electronic balance 80, in order to provide the specified rigidity to the lever 83, the thickness must be increased, causing a problem of increased weight.

That is, because the width of this lever 83 is the same as that of the Roberval's mechanism 81, it is unable to reduce the weight while maintaining the rigidity.

In addition, in general, in this kind of lever 83, as the lever length is increased, the load applied to the mobile section 81b of the Roberval's mechanism 81 can be attenuated, and at the same time, the measurement accuracy as the electronic balance 80 can be improved by increasing the displacement rate of the free end 83a of the lever 83 (hereinafter called the "displacement rate").

And yet, since with the lever 83 of the first conventional electronic balance 80 with the above-mentioned configuration causes restrictions that the lever length is shorter than the Roberval's mechanism 81, there is a limit to the improvement of measuring accuracy.

This kind of Roberval's mechanism 81 is formed with the measurement range of the mass of the substance to be weighed previously specified.

In particular, the rigidity of the whole Roberval's mechanism 81 and the spring constant of the spring section 87 are set to fit to the measurement of the mass of the substance to be weighed in the relevant measuring range.

The rigidity of this Roberval's mechanism 81 and the spring constant of the spring section 87 have influences on the start of measurement of the mass of the substance to be measured, that is, the time from when the substance to be weighed is placed until the vibration of the mobile section 81*b* ends to enable the measurement (response time).

However, in the first conventional electronic balance 80, etc. as described above, the Roberval's mechanism 81 is formed by hollowing a rectangular aluminum block, etc. from the one section into a specified shape and has a configuration to have a total of 4 pieces of thin-wall spring section 87.

Consequently, in the first conventional electronic balance 80, etc., there is a problem of damaging the thin-wall spring section 87 if external vibration or impact is applied to the spring section 87 located between the mobile section 81*a* and the fixed section 81*b* when the Roberval's mechanism 81 is being transferred to the subsequent assembly step, etc. after forming the Roberval's mechanism 81.

This problem occurs not only during transportation but also when an unexpected load is applied to the spring section 87 during the assembly step for mounting the Roberval's mechanism 81 to the supporter 88*a* of the base frame 88 or when an impact load due to an unexpected matter falling on the scale plate 89 is applied to the spring section 87 via the mobile section 81*b* while the balance is used after assembly.

Or, as shown in FIG. 25, since the Roberval's mechanism 91 and the lever 92 are formed separately in the second conventional electronic balance 90, it has an advantage that the manufacture of each component can be carried out more easily.

And yet, because in this second conventional electronic balance 90, the overall size, particularly, the width W becomes the width of the lever 92 added to the Roberval's mechanism 91, it has the problem of a big size as a whole.

For example, in the second conventional electronic balance 90, when heavier mass is intended to measure, the width W of the Roberval's mechanism 91 will be increased, but since the overall width becomes constantly wider by the width of the lever 92 added, the balance is unable to be downsized.

In addition, because the base end section 92*b* of the lever 92 is held by a plurality of fulcrum member 93 and hanging band 94 in the second conventional electronic balance 90, it has a problem of complicated and troublesome assembly and adjustment of the lever 92.

And as shown in FIG. 26, with respect to the third conventional electronic balance 100, it has an advantage of forming the Roberval's mechanism 101 separately from the lever 103, but since the lever 103 is installed on both sides of the Roberval's mechanism 101, the overall size, particularly, the width W becomes large, and the electronic balance has a problem of inability to be downsized.

In all the first to third conventional electronic balances 80, 90, 100, generally aluminum is used for the material of the Roberval's mechanism and the lever.

When the electromagnetic coil or balancing position detection sensor is installed to the free end section of the lever, if the material of the fixing members of these is aluminum, the metal of the same kind used for Roberval's mechanism and the lever, they are weak against the bend, and in general, stainless steel screws are used.

And yet, since the linear expansion coefficient differs in dissimilar metals such as aluminum and stainless steel, when strain is generated at the screw fixing section, the mounting position of the electromagnetic coil and the balancing position detection sensor vary, causing problems of generating an error in the balancing control, or failure to carry out stable control, and the weighing accuracy is unable to be improved as an electronic balance.

Or, by equipping a plurality of fulcrums to the lever, it is possible to increase the attenuation amount for the free end side during load application and improve the only weighing accuracy had been increased.

However, if a plurality of fulcrums is equipped to the lever, the fulcrums each are formed by the thin-wall spring section, causing problems of increasing the places to be required the process accuracy of only the fulcrums had been increased and not being unable to manufacture easily.

Even if the Roberval's mechanism and the lever are simply formed separately, when the number of fulcrums increases, there is a fear in that the spring section may be damaged under the component condition up to assembly unless the lever is carefully handled and the balance is unable to be used.

BRIEF SUMMARY OF THE INVENTION

Accordingly, it is an objective of the present invention to provide an electronic balance which can be easily assembled and maintained and can be downsized.

Another object of the present invention is to provide an electronic balance which can be assembled easily and highly accurately and that enables downsizing and can improve the measurement accuracy.

Still a further object of the present invention is to provide an electronic balance that can protect the spring section of the Roberval's mechanism by improving the mobile range of the Roberval's mechanism.

In order to achieve the above objectives, according to the present invention, (1) it is possible to provide an electronic balance comprising:

a Roberval's mechanism containing a fixed section, a mobile section that is applied with the load of the substance to be weighed and moves in the vertical direction with respect to the fixed section, and a pair of upper and lower Roberval's sections that link the fixed section and the mobile section, a lever that has one end, the other end, and fulcrums, is located between a pair of the upper and the lower Roberval's sections of the Roberval's mechanism, receives the motion of the mobile section of the Roberval's mechanism with the one end, and allows the other end to displace via the fulcrums, balance driving means that is equipped to the other end of the lever and controls the lever to achieve the balancing state, characterized in that the Roberval's mechanism and the lever are configured separately, to the Roberval's mechanism, a lever housing section is formed for inserting the lever in the longitudinal direction and enabling the lever to be located between a pair of the upper and the lower Roberval's sections, to the other end of the lever, a section extending outwards beyond the lever housing section is equipped, and balance driving means is mounted to the section equipped to the other end of the lever and extending outwards.

In order to achieve the above objects, according to the present invention, (2) an electronic balance recited in Item (1) characterized in that the lever is housed in the lever housing section, the mobile section on the one end side is linked and fixed to the mobile section of the Roberval's mechanism, and the other end side displaces by the specified volume from the balancing state by operating together with the motion of the mobile section of the Roberval's mechanism.

In order to achieve the above objects, according to the present invention, (3) an electronic balance recited in Item (1) characterized in that in the lever housing section, a stepped section which comes in contact with the one side section of the lever along the longitudinal direction of the Roberval's mechanism and which guides the lever housing position to the lever housing section is formed.

According to the above configuration, inside the Roberval's mechanism 2, the lever housing section 2b is opened and formed from the one end section 2a side.

The lever 4 is housed and fixed to this lever housing section 2b and the free end 4b is extended outwards in the width smaller than the opening diameter and formed.

By this, balance driving means 6 can be installed to the position outside the Roberval's mechanism 2, rendering itself capable for easy assembly and maintenance and inspection.

To the lever housing section 2b, a stepped section 22d in contact with the one side section of the lever 4 is formed along the length direction of the Roberval's mechanism 2 and guides the lever 4 when it is housed, eliminating fixing errors and enabling easy assembly.

In order to achieve the above objects, according to the present invention, (4) it is possible to provide the electronic balance recited in Item (1) further comprising:

a thin-wall spring section that is equipped to the lever, includes the fulcrums that can obtain the attenuation rate of the specified force from the one end section to the free end, forms the fixed section and the mobile section on the lever, and links these, and bridges installed between the fixed section and the mobile section of the lever, fixes and supports the position of the fixed section and the mobile section, and is cut off after the lever is fixed to the Roberval's mechanism.

In order to achieve the above objects, according to the present invention, (5) it is possible to provide the electronic balance recited in Item (4) characterized in that cutting holes for cutting the bridge are opened at the bridge arranging position of the lever in the Roberval's mechanism.

In order to achieve the above objects, according to the present invention, (6) it is possible to provide the electronic balance recited in Item (1) further comprising:

position detection means for detecting the displacement rate of the lever, a fixed surface formed at the free end of the lever and to which balance driving means is fixed, a stepped surface formed at the free end of the lever and formed in the direction in which the lever displaces with respect to the fixed surface and formed low with a specified level difference, and a fixing member of the dissimilar metal different from the lever material for fixing balance driving means and position detection means with respect to the lever, wherein balance driving means only is fixed to the fixed surface and position detection means is arranged and fixed to the stepped surface.

In order to achieve the above objects, according to the present invention, (7) it is possible to provide the electronic balance recited in Item (6) characterized in that a restricting member that composes restricting means for restricting the travel amount of the free end of the lever is arranged and fixed.

In order to achieve the above objects, according to the present invention, (8) it is possible to provide the electronic balance recited in Item (1) characterized in that to the lever, the first reinforcement piece with a specified thickness and protrudably formed along the width direction is installed, and the second reinforcement piece with a specified thickness along the length direction crossing at right angles with the width direction of the lever and protrudably formed continuously from the first reinforcement piece is installed.

According to the above configuration, the Roberval's mechanism 2 and the lever 4 are separated, and to this lever 4, bridges 29a, 29b for linkage and fixing are installed between the fixed section 30 and the mobile section 32.

These bridges 29a, 29b are cut off after the lever 4 is assembled to the Roberval's mechanism 2.

By this, it is possible to install the lever 4 with the size of each section maintained at the time of assembly, enabling easy assembly and improving the assembly accuracy.

In addition, because of the configuration in which the lever comprises the fixed section 30 and the mobile section 32, and fulcrums A and B are formed at the spring section 34, high-accuracy measurement that provides the attenuation rate of the specified force is achieved.

In addition, to the free end 4b of the lever 4, balance driving means 6, position detection sensor 42, and lever travel restricting means are installed.

And by mounting one balance driving means 6 to the one step higher fixed surface 4ba and the other to the stepped surface 4bb, even if the fixing member 45 for fixing these is thermally expanded and the stepped surface 4bb is subject to the influence, it is possible to prevent the plane position of the fixed surface 4ba from varying in the displacement direction of the lever 4.

By this, the driving characteristics can be kept constant without generating variations in mounting height position of balance driving means 6, free of tilts, and without generating variations in control current.

To this lever 4, the first and the second reinforcement pieces 38, 39 which cross at right angles each other and are protrudably formed are installed, enabling the lever 4 to provide the specified rigidity even if it is not a block lump and at the same time the size and the weight can be reduced.

In order to achieve the above objects, according to the present invention, (9) it is possible to provide the electronic balance recited in Item (1) characterized in that a pair of upper and lower Roberval's sections are formed by hollowing a solid metal material block and with the specified length via thin-wall spring section between the fixed section and the mobile section, and the Roberval's mechanism moves the mobile section applied with the load of the substance to be weighed in the horizontal state.

In order to achieve the above objects, according to the present invention,

(10) it is possible to provide the electronic balance recited in Item (9) further comprising a restriction section that is equipped between the fixed section and the mobile section of the Roberval's mechanism and that forms a clearance for restricting the mobile range of the mobile section.

In order to achieve the above objects, according to the present invention,

(11) it is possible to provide the electronic balance recited in Item (10) characterized in that the restriction section is formed by hollowing the solid metal material block together with the Roberval's mechanism, and the restricting clearance section cut in the form of streak for restricting the mobile range of the mobile section is installed at the beam section that links the fixed section to the mobile section of a pair of upper and lower Roberval's sections.

In order to achieve the above objects, according to the present invention,

(12) it is possible to provide the electronic balance recited in Item (11) characterized in that the fixed section and the mobile section of the lever are linked and fixed to the fixed side and the mobile side, respectively, via the restricting clearance section.

According to the above configuration, the Roberval's mechanism 2 and the lever 4 are formed separately, and to the lever 4, bridges 29a, 29b for linkage and fixing are installed between the fixed section 30 and the mobile section 32.

The bridges 29a, 29b are cut after they are assembled to the Roberval's mechanism 2.

By this, it is possible to mount the lever 4 with the size of each section maintained at the time of assembly, achieving easy assembly and improving the assembly accuracy.

In addition, because the lever 4 comprises the fixed section 30 and the mobile section 32, and fulcrums A and B are provided at the spring section 34, the high-accuracy measurement with the attenuation rate of the specified force will be enabled.

To the free end 4b of the lever 4, balance driving means 6, position detection sensor 42, and lever travel restriction means are installed.

And by mounting one balance driving means 6 to the one step higher fixed surface 4ba and the other to the stepped surface 4bb, even if the fixing member 45 for fixing these is thermally expanded and the stepped surface 4bb is subject to the influence, it is possible to prevent the plane position of the fixed surface 4ba from varying in the displacement direction of the lever 4.

By this, the driving characteristics can be kept constant without generating variations in mounting height position of balance driving means 6, free of tilts, and without generating variations in control current.

To this lever 4, the first and the second reinforcement pieces 38, 39 which cross at right angles each other and are protrudably formed are installed, enabling the lever 4 to provide the specified rigidity even if it is not a block lump and at the same time the size and the weight can be reduced.

In order to achieve the above objectives, according to the present invention,

(13) it is possible to provide a manufacturing method of an electronic balance comprising:

a step for preparing a Roberval's mechanism containing a fixed section, a mobile section that is applied with the load of the substance to be weighed and moves in the vertical direction with respect to the fixed section, and a pair of upper and lower Roberval's sections that link the fixed section and the mobile section, a step for preparing a lever that is configured separately from the Roberval's mechanism, has one end, the other end, and fulcrums, is located between a pair of the upper and the lower Roberval's sections of the Roberval's mechanism, receives the motion of the mobile section of the Roberval's mechanism with the one end, and allows the other end to displace via the fulcrums, characterized in that the step for preparing the Roberval's mechanism has a step for forming a lever housing section that enables the lever to be inserted into the Roberval's mechanism in the longitudinal direction and enabling the lever to be located between a pair of the upper and the lower Roberval's sections, and the step for preparing the lever has a step for containing the fulcrums for obtaining the attenuation amount of the specified force from the one end section to the free end of the lever and forming the fixed section and the mobile section in the lever, a step for forming bridges for fixing and keeping the positions of the fixed section and the mobile section between the fixed section and the mobile section of the lever, and a step for cutting the bridges after fixing the lever to the Roberval's mechanism.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
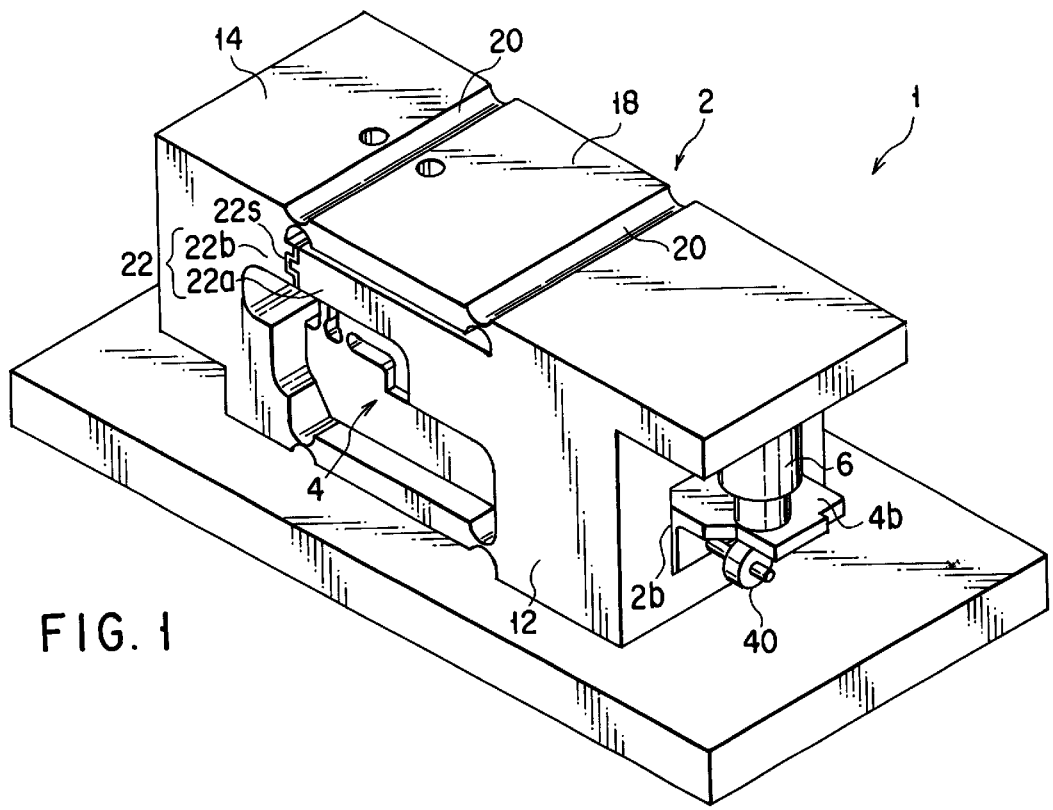
FIG. 1 is a perspective view showing the first embodiment of the electronic balance according to the present invention.

Reference will now be made in detail to the presently preferred embodiments of the invention as illustrated in the accompanying drawings, in which like reference numerals designate like or corresponding parts.

Referring now to drawings, the embodiment of the electronic balance according to the present invention will be described as follows.

(First Embodiment)

FIG. 1 is a perspective view showing the general configuration of the first embodiment of the electronic balance according to the present invention.

The electronic balance 1 comprises a Roberval's mechanism 2, lever 4, balance driving means 6 comprising an electromagnetic coil for controlling the lever 4 in the balancing state, position detection means 42 (see FIG. 6) and a control section (not illustrated).

By fixing a load receiving member (not illustrated) on the mobile section 14 of the Roberval's mechanism 2, it is possible to configure a so-called dynamic balance with a conveyor placed on the load receiving member.

And this kind of dynamic balance measures the mass of the substance to be weighed while the substance to be weighed is being carried by a conveyor.

It is also possible to configure the electronic balance as a static balance for installing a scale plate on the mobile section 14, placing the substance to be weighed on the scale plate, and measuring the mass.

Figure 2:
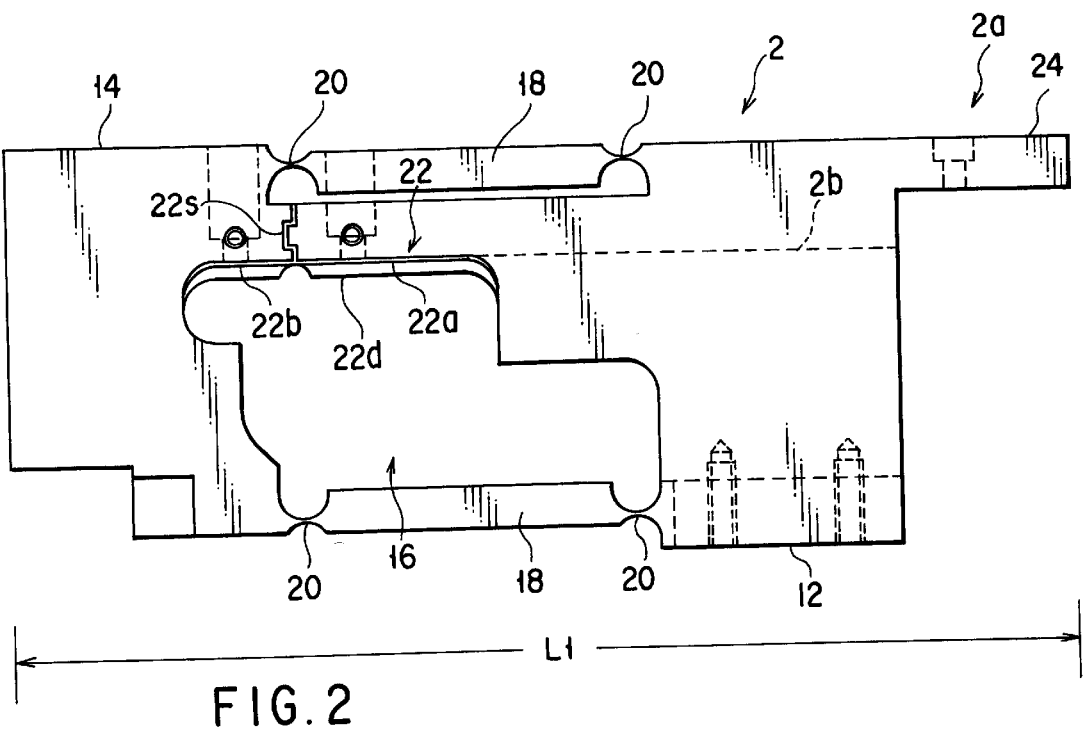
FIG. 2 is a front view showing the Roberval's mechanism of FIG. 1.
Figure 3:
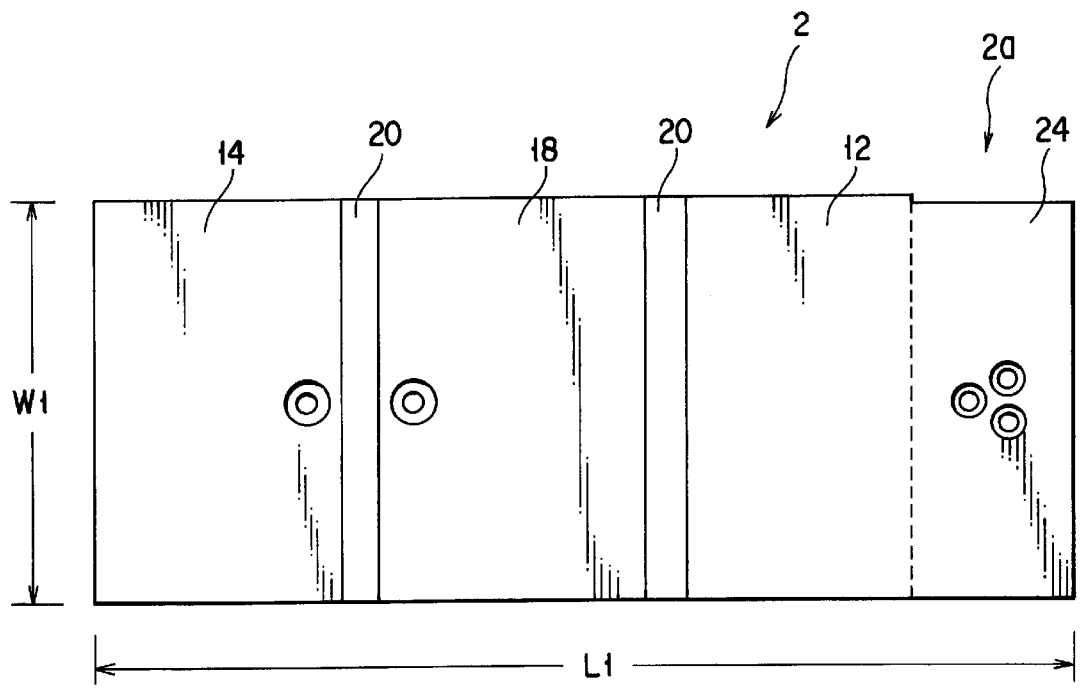
FIG. 3 is a plan view showing the Roberval's mechanism of FIG. 1.
Figure 4:
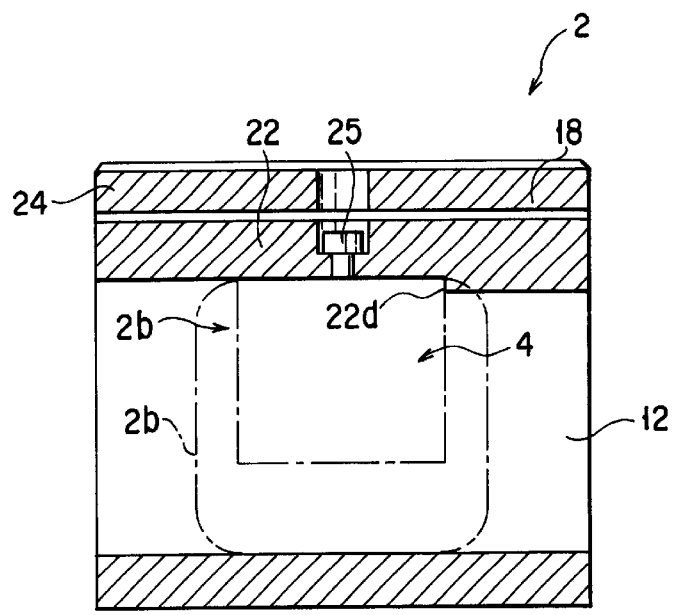
FIG. 4 is a sectional side view showing the Roberval's mechanism of FIG. 1.

FIG. 2 is a front view showing the Roberval's mechanism 2 of FIG. 1, FIG. 3 is a plan view showing the Roberval's mechanism of FIG. 1, and FIG. 4 is a sectional side view showing the Roberval's mechanism 2 of FIG. 1.

That is, this Roberval's mechanism 2 has a fixed section 12 and a mobile section 14 that moves in the vertical direction with respect to the fixed section 12.

The top surface of this mobile section 14 is formed slightly higher than the fixed section 12.

The Roberval's mechanism 2 is formed by hollowing a rectangular aluminum block material, etc. of length L1 and width W1 from the front side and penetrably forming the hollow section 16 in the inside.

This Roberval's mechanism 2 may have the hollow section 16 formed by extrusion, etc.

In such event, to the Roberval's mechanism 2, a pair of parallel Roberval's sections 18 with a specified thickness at the top and the bottom is mounted.

A pair of these top and bottom Roberval's sections 18 have the same length with respect to the longitudinal direction (L1) and a plurality of thin-wall spring sections 20 are formed on both ends, respectively.

In this case, the spring section 20 is installed at 2 places each on the top and bottom surfaces, at a total of 4 places, and they are arcuate as seen from the side surface from the top and bottom surface, and are formed in a linear form continuously in the width W1 direction.

At the position immediately below the upper Roberval's section 18, a lever fixed section 22 is formed for fixing the lever 4 in parallel to the Roberval's section 18.

This lever fixed section 22 is configured to have a clearance section 22s formed by cutting at the midway in the longitudinal direction (L1) of the Roberval's mechanism 2 in correspondence to the fixed section 12 and the mobile section 14 of the Roberval's sections 18 and by this clearance section 22s, the mobile section 14 is free to move with respect to the fixed section 12.

By this clearance section 22s by cutting, the lever fixed section 22 is configured to have the fixed side 22a and the mobile side 22b.

On the one end side 2a of the longitudinal direction (L1) of the Roberval's mechanism 2, a protruded piece 24 of a specified length is formed at the top.

To the bottom surface of this protruded piece 24, balance driving means 6 (see FIG. 1) is mounted.

From the center section of the one side surface of the Roberval's mechanism located on this one end side 2a to the inside of the Roberval's mechanism 2, a nearly rectangular form lever housing section 2b is formed with an opening by hollowing.

This lever housing section 2b is formed on the bottom surface of the lever fixed section 22 and is formed by hollowing to the position of the mobile section 14 side as seen from the front side of FIG. 2 (until it reaches beyond the spring section 20 of the Roberval's section 18).

Figure 5:
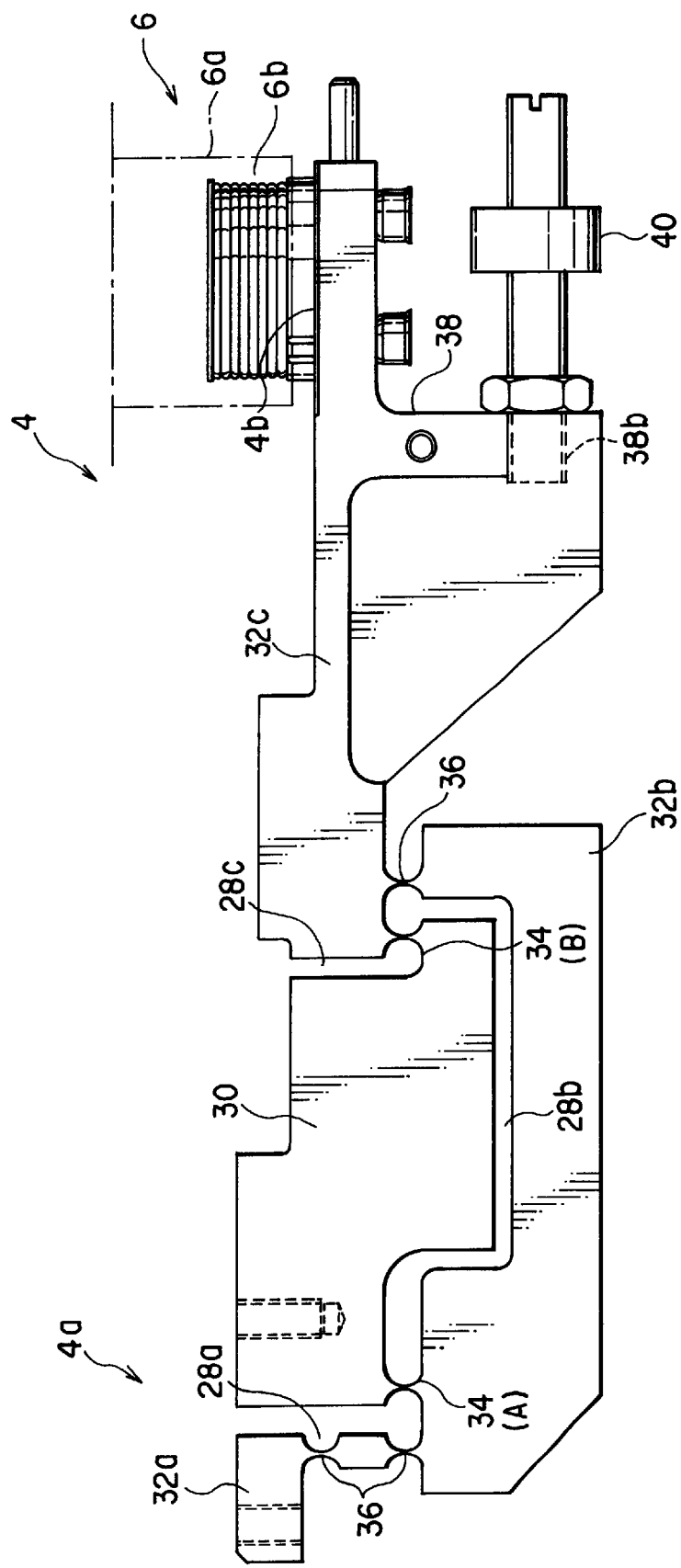
FIG. 5 is a front view showing the lever of FIG. 1.
Figure 6:
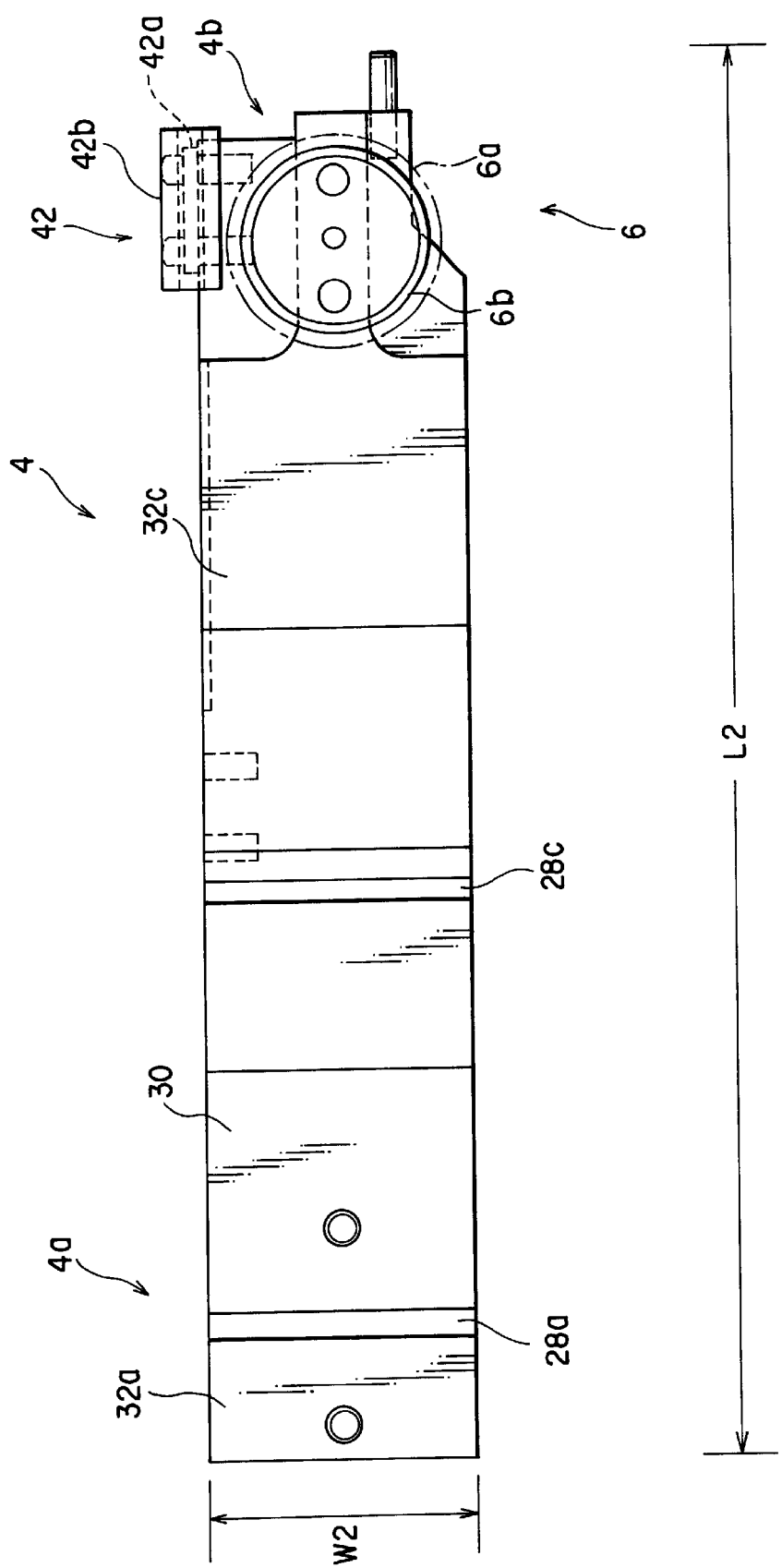
FIG. 6 is a plan view showing the lever of FIG. 1.
Figure 7:
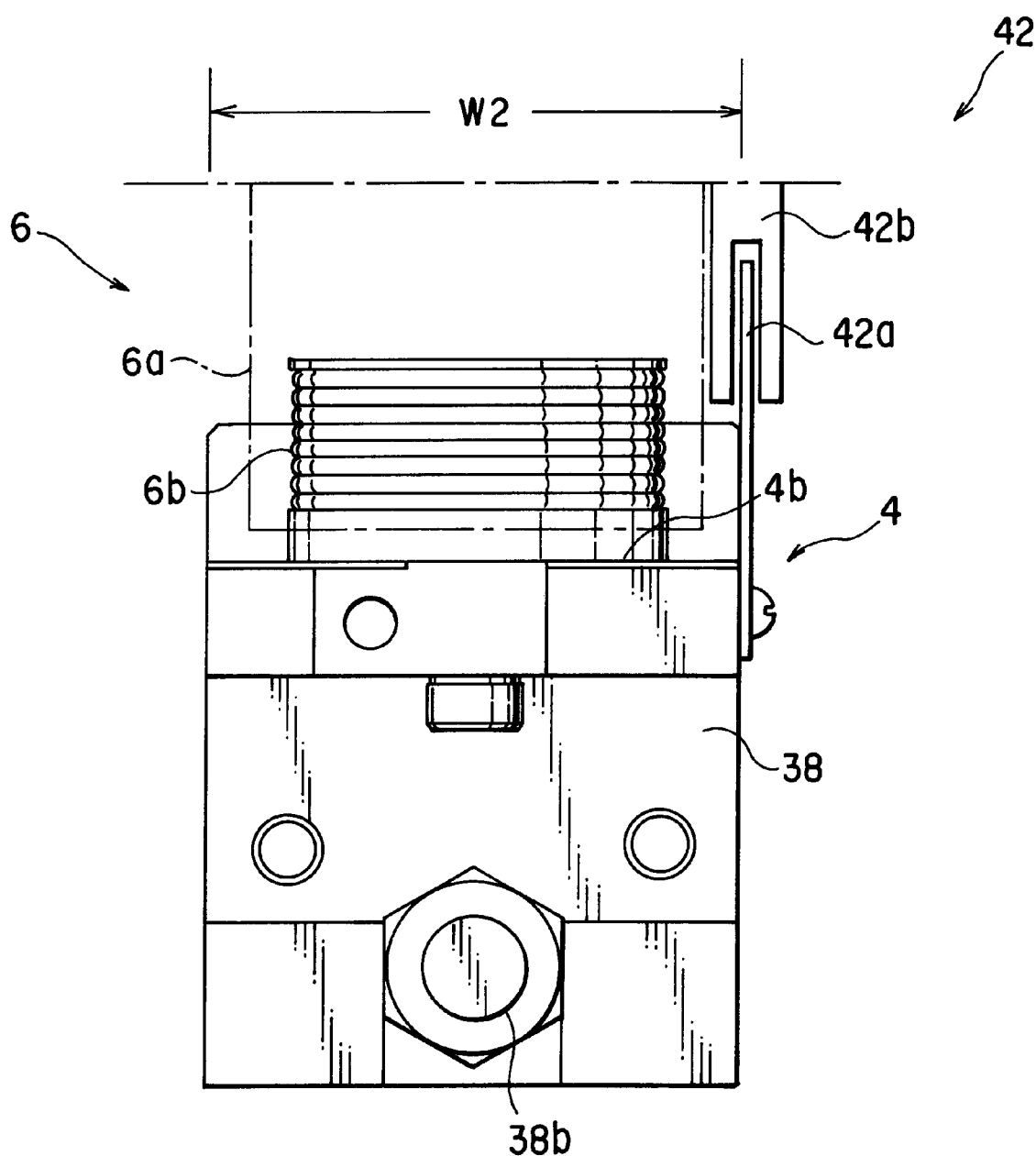
FIG. 7 is a side view showing the lever of FIG. 1.

FIG. 5 is a front view showing the lever 4 of FIG. 1, FIG. 6 is a plan view showing the lever 4 of FIG. 1, and FIG. 7 is a side view showing the lever of FIG. 1.

That is, this lever 4 has a width W2 narrower than the width W1 of the Roberval's mechanism 2 and smaller size and reduced weight has been achieved.

On the base end section 4a of this lever 4, a fixed section 30 and a mobile section 32a to be fixed to the fixed section 12 and the mobile section 14 of the Roberval's section 18, respectively.

In addition, the other end side of this lever 4 is a free end 4b, and this free end 4b is extended to the external position of the Roberval's mechanism 2 in the condition after the lever is fixed, and is located immediately below the protruded piece 24 of the Roberval's mechanism 2.

This lever 4 has the mobile section 32a moved in linkage with the travel of the mobile section 14 of the Roberval's mechanism and has the free end 4b side moved vertically.

This lever 4 has fulcrums A, B at two places, and these fulcrums A, B at two places have a function to attenuate the mass of the substance to be weighed (load applied) applied to the mobile section 14 of the Roberval's mechanism by a specified rate and shorten the length L2 of the lever 4.

This lever 4 is also formed by hollowing the aluminum block material, etc.

In particular, in the lever 4, a grounded section 28 (28a, 28b, 28c) is penetrably formed in a nearly U-letter shape as seen from the front.

By this grounded section 28, the fixed section 30 is formed nearly at the center section and mobile sections 32 (32a, 32b, 32c) are formed on both sides and on the bottom surface of this fixed section 30 in the lever 4.

The fixed section 30 and the mobile section 32 of this lever 4 are connected to one another by thin-wall spring sections 34 at the two places located at fulcrums A, B.

These spring sections 34 are formed in the shape nearly same as that of the spring section 20 of the Roberval's mechanism 2 and the description will be omitted.

On the mobile section 32 side of the lever 4, a plurality of spring sections 36 are formed in required places (a total of 3 places) in the same manner as the spring section 34 in order to efficiently transmit the load applied to the base end section 4a of this lever 4 to the free end 4b side via fulcrums A, B at the spring section 34 and at the same time to maintain the strength of the spring section 34.

In addition, on the free end 4b side of the lever 4, a balance weight mounting piece 38 is formed protrudably downwards, and the balance weight 40 is slidably mounted to the nearly horizontal screw hole 38b section in the horizontal direction.

This balancing weight 40 is equipped for balancing the lever 4 by adjusting this balancing weight 40 when the weight of the load receiving member, etc. is applied to the mobile section 14 of the Roberval's mechanism 2 later discussed.

To the free end 4b section of the lever 4, a position detection sensor 42 is arranged.

This position detection sensor 42 comprises a detection plate 42a fixed to the free end 4b side of the lever 4 with a specified height provided vertically and emitted and received light sensor 42b fixed to the bottom surface of the protruded piece 24 of the Roberval's mechanism 2.

Now, in the detection plate 42a, a detection hole is opened.

The emitted and received light sensor 42b detects the vertical travel of the detection hole of this detection plate 42a, detects the balancing state of the lever 4 and the vertical displacement volume with the balancing state set as a reference, and outputs the detection results to the control section.

And the electromagnetic coil composing balance driving means 6 has the annular form magnetic material 6a fixed to the bottom surface of the protruded piece 24.

In addition, on the top surface of the free end 4b of the lever 4, a wound coil 6b is fixed to the annular inside of the magnetic material 6a.

This balance driving means 6 is subject to the current control of the control section during measuring the substance to be weighed, and varies the magnetic force with the magnetic material 6a by the current supplied to the coil 6b, and returns the lever 4 to the balancing state.

Figure 8:
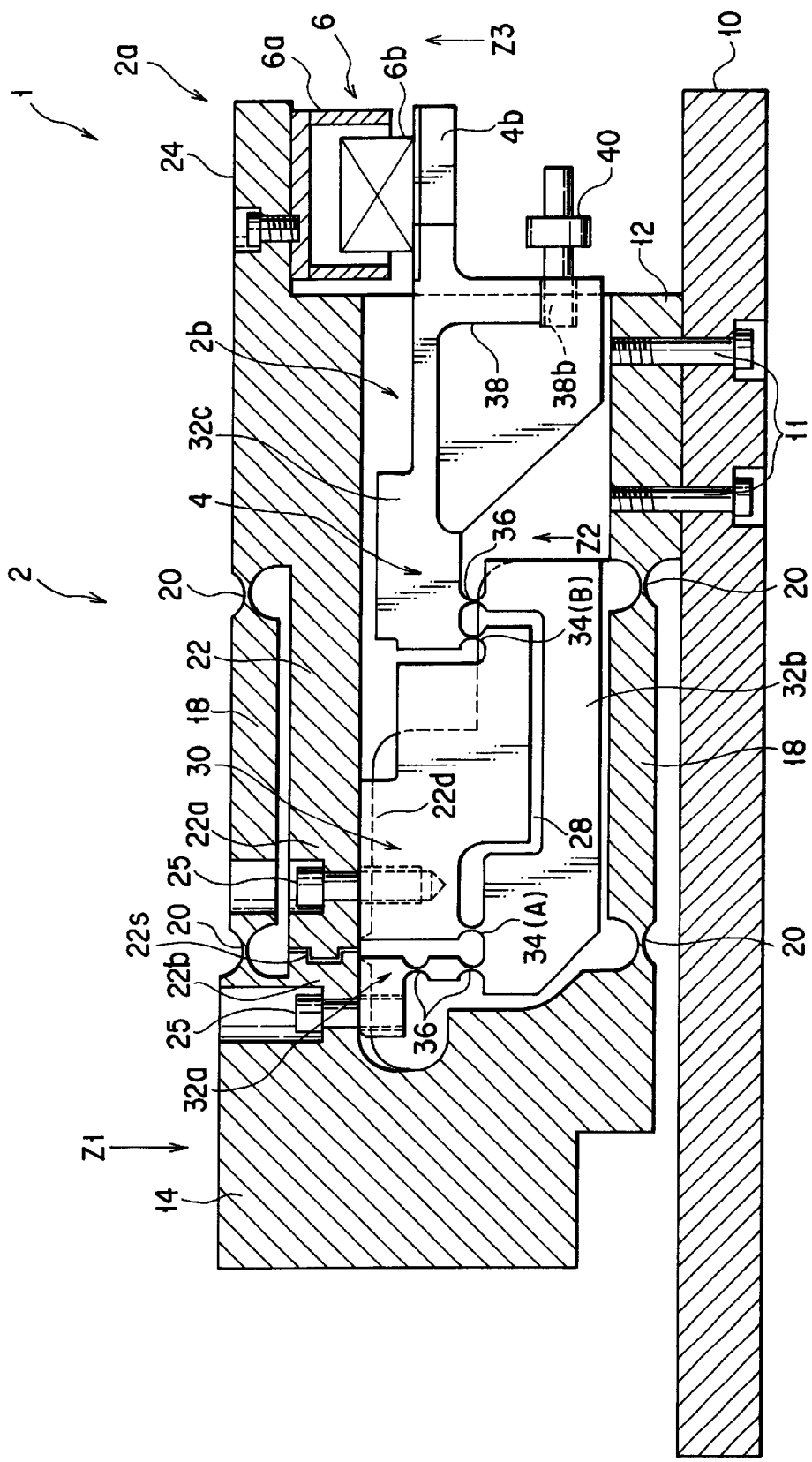
FIG. 8 is a front view, partly in cross section, showing the condition assembling the lever shown in FIGS. 5 to 7 into the Roberval's mechanism shown in FIGS. 2 to 4.

FIG. 8 is a front view, partly in cross section, showing the assembly condition of the electronic balance.

In FIG. 8, for convenience, the lever 4 was not broken away but the Roberval's mechanism only is shown in the broken away condition.

That is, as shown in FIG. 8, the electronic balance 1 is configured by inserting and fixing the lever 4 into the inside of the lever housing section 2b of the Roberval's mechanism 2.

Now, the Roberval's mechanism 2 has the fixed section 12 fixed to the base plate 10 with a screw 11.

The lever 4 inserted into the lever housing section 2b has the base end side 4a fixed to the lever fixed section 22 with the screw 25.

As shown in FIG. 4, on the bottom surface of the lever fixed section 22 that forms the lever housing section 2b, a stepped section 22d that guides the one side surface of the lever 4 along the longitudinal direction (L1) is formed.

By this, the mounting error at the time of lever 4 insertion can be eliminated, precise positioning is possible, and east assembly can be achieved.

And the fixed section 30 of the lever 4 is fixed to the fixed side 22a of the lever fixed section 22.

The mobile section 32 of the lever 4 is fixed to the mobile side 22b of the lever fixed section 22.

Under this fixed condition, the free end 4b of the lever 4 is protruded to the one end side 2a of the Roberval's mechanism 2 and is located immediately below the protruded piece 24.

Because by this, balance driving means (electromagnetic coil) 6 can be mounted to the outside of the Roberval's mechanism 2, assembly at the time of manufacture, adjustment after assembly, and maintenance such as replacement, etc. can be easily carried out.

By the configuration in which the lever 4 is mounted from the inside to the outside of the Roberval's mechanism 2, the length (L2) of the lever 4 can be made longer and at the same time, the width of the overall electronic balance 1 can be decided by the width (W1) of the Roberval's mechanism 2 and both width and length of the electronic balance 1 can be reduced.

Next discussed is the mass measuring operation of the substance to be weighed by the electronic balance 1 of the above configuration.

First of all, by moving and adjusting the balancing weight 40 in the horizontal direction, adjustment is made to achieve balance of the lever 4 under the weight load applied condition of the load receiving section (including the conveyor weight).

In such event, the lever 4 balancing condition is detected by the position detection sensor 42.

Then, the substance to be weighed is placed on the conveyor and carried and moved on the conveyor.

And the Roberval's mechanism 2 is applied with the substance to be weighed and the mobile section 14 descends in the illustrated arrow mark Z1 direction.

In such event, the Roberval's section 18 lowers the mobile section 14 with the level condition maintained by deformation of the spring sections 20 at a total of 4 places.

In linkage with the lowering of the mobile section 14 of the Roberval's section 18, the mobile section 32a of the lever 4 descends in the same manner.

When the mobile section 32a of the lever 4 descends, the free end 4b of the lever 4 (mobile section 32c) ascends in the illustrated arrow mark Z3 direction with the spring section 34 (fulcrum B) set as a center as the mobile section 32b rises in the illustrated arrow mark Z2 direction with the spring section 34 (fulcrum A) set as a center.

By this, the free end 4b of the lever 4 displaces (ascends) in a specified amount with respect to the balancing condition and this displacement amount is detected by the position detection sensor 42.

The control section energizes and controls the electromagnetic coil of balance driving means 6 to return the lever 4 to the balancing state again.

In this event, the control section controls the current direction with respect to the coil 6b of the electromagnetic coil and the current amount to be fed, receives the current value to the electromagnetic coil 6b when the position detection sensor 42 detects that the lever 4 achieves the balancing state again, and calculates and outputs the mass of the substance to be weighed on the basis of the current value.

As described above, in the electronic balance according to the first embodiment of the present invention, the mass of the substance to be weighed (load applied) applied to the mobile section 32 side can be transmitted to the free end 4b side after attenuating by providing fulcrums at two places A, B to the lever 4 and at the same time can increase the displacement amount on the free end 4b side with respect to the travel amount on the mobile sections 32a, 32b and 32c side.

By this, in the electronic balance according to the first embodiment of the present invention, the weighing accuracy can be improved.

In an electronic balance according to the first embodiment of the present invention, by the configuration in which the lever 4 is mounted from the inside to the outside of the Roberval's mechanism 2, the configuration with the specified attenuation amount can be achieved with the length L2 of the lever 4 being elongated, and at the same time, the size and the weight can be reduced.

In the electronic balance according to the first embodiment of the present invention, by reducing the size and the weight of the lever 4 in this way, reactions of travel with respect to the load can be made more sensitive, and the weighing accuracy can be improved.

Because if the force is applied from the free end 4b side of the lever 4, the force can be increased to transmit to the mobile sections 32a, 32b and 32c side (mobile section 14 side of the Roberval's mechanism 2), it is possible to apply brakes to the lever 4 with a small force on the free end 4b side.

And the electronic balance 1 can stand the use particularly as a dynamic balance in which conveyors and other heavy substance can be equipped to the load receiving section.

This rigidity can be obtained by the Roberval's mechanism 2 which has comparatively wide width W1.

This improvement in the rigidity can achieve an electronic balance 1 that can stand impact, etc. when the substance to be weighed is placed on the conveyor.

In this way, because the lever 4 is installed inside the Roberval's mechanism 2 in the electronic balance according to the first embodiment of the present invention, even when the width W1 of the Roberval's mechanism 2 is increased, the width of the electronic balance 1 can be decided by the width W1 of this Roberval's mechanism 2, and the size reduction can be achieved as the overall electronic balance 1.

As described above, according to the electronic balance of the first embodiment of the present invention, the lever housing section is opened and forced from the one end section side in the Roberval's mechanism and the lever is housed and fixed to this lever housing section, and thereby, the lever free end can be located outside.

By this, in the electronic balance according to the first embodiment of the present invention, balance driving means can be mounted to the location outside the Roberval's mechanism, and assembly and maintenance and inspection can be carried out easily.

In the electronic balance according to the first embodiment of the present invention, it has a configuration to house the lever in the lever housing section, and size reduction can be achieved as a whole electronic balance.

In the electronic balance according to the first embodiment of the present invention, providing a stepped section to the lever housing section along the length direction of the Roberval's mechanism and allowing it to come in contact with the one side section of the lever can guide the lever at the time of assembly, eliminating the mount errors and achieving accurate and easy assembly.

(Second Embodiment)

Figure 9:
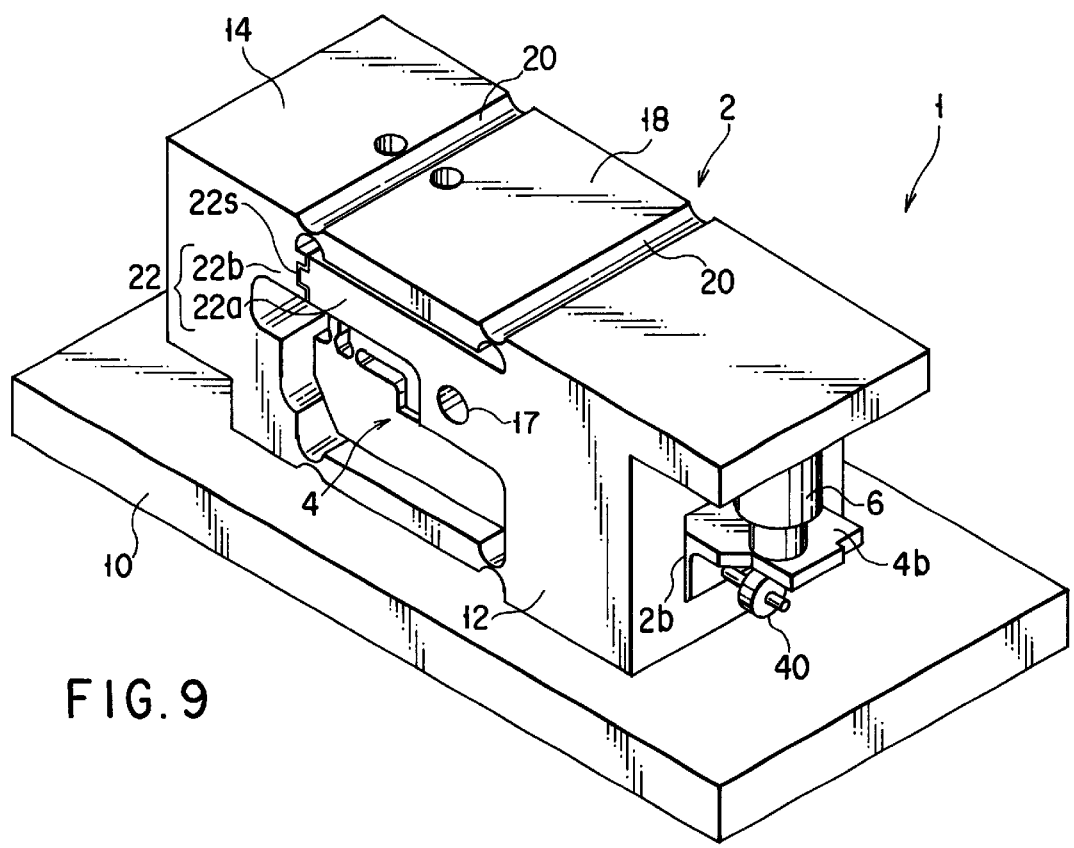
FIG. 9 is a perspective view of the second embodiment of the electronic balance according to the present invention.
Figure 10:
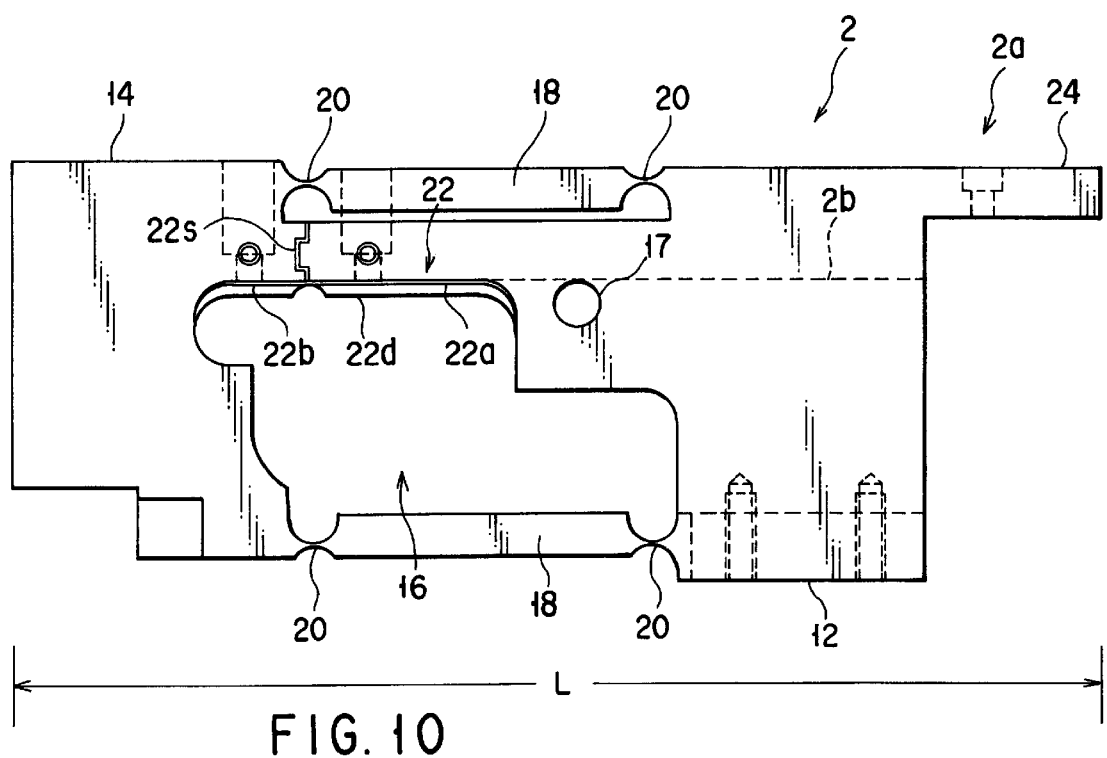
FIG. 10 is a front view showing the Roberval's mechanism of FIG. 9.
Figure 11:
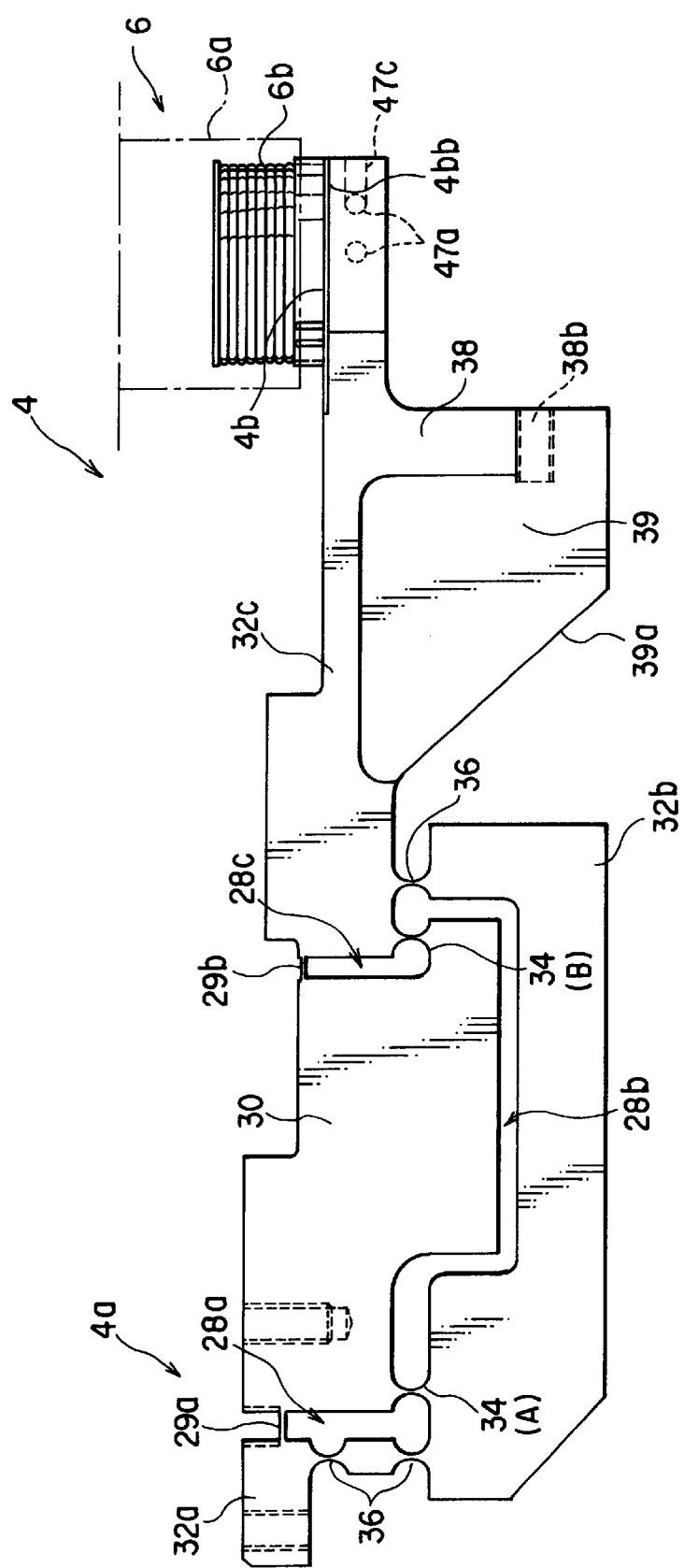
FIG. 11 is a front view showing the lever of FIG. 9.
Figure 12:
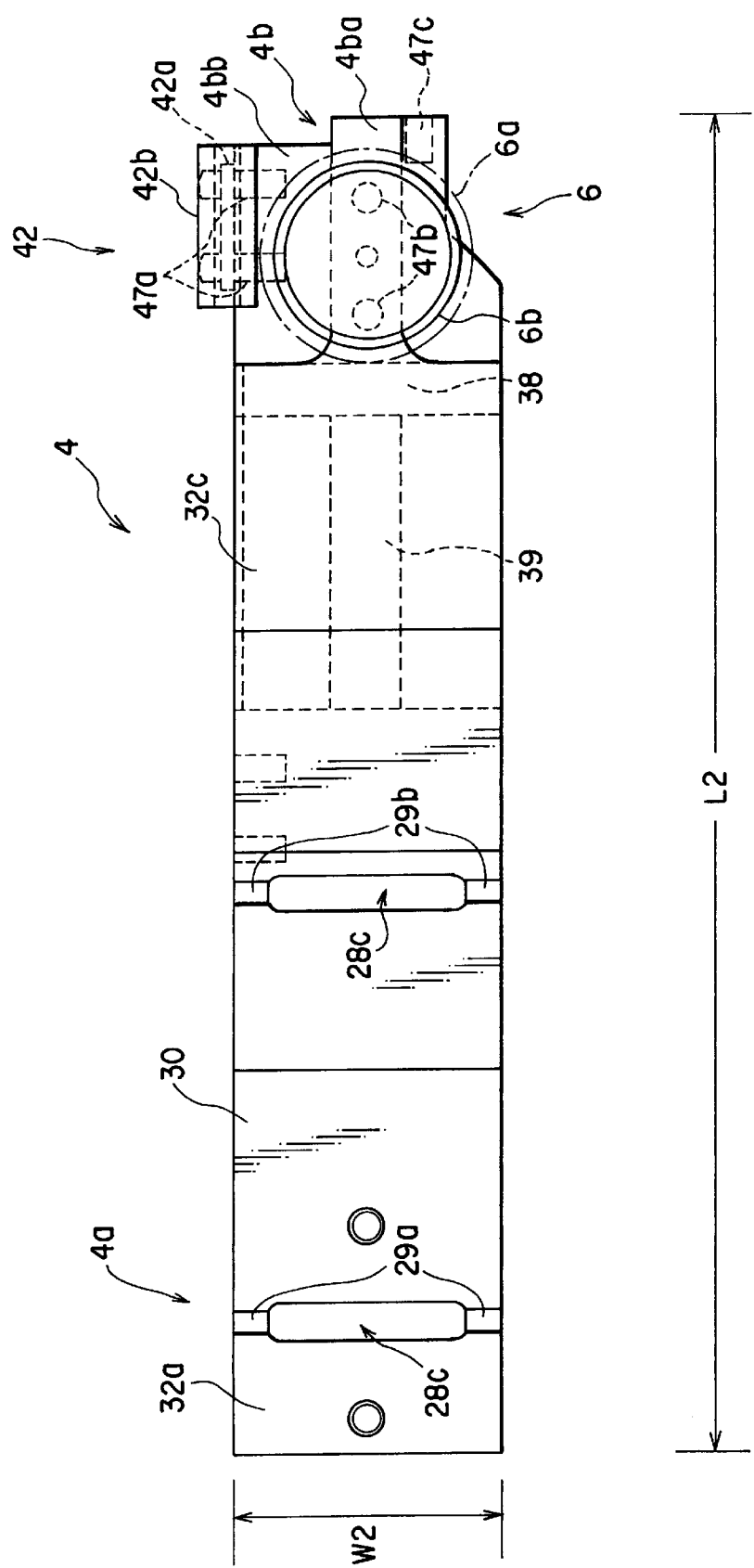
FIG. 12 is a plan view showing the lever of FIG. 9.
Figure 13:
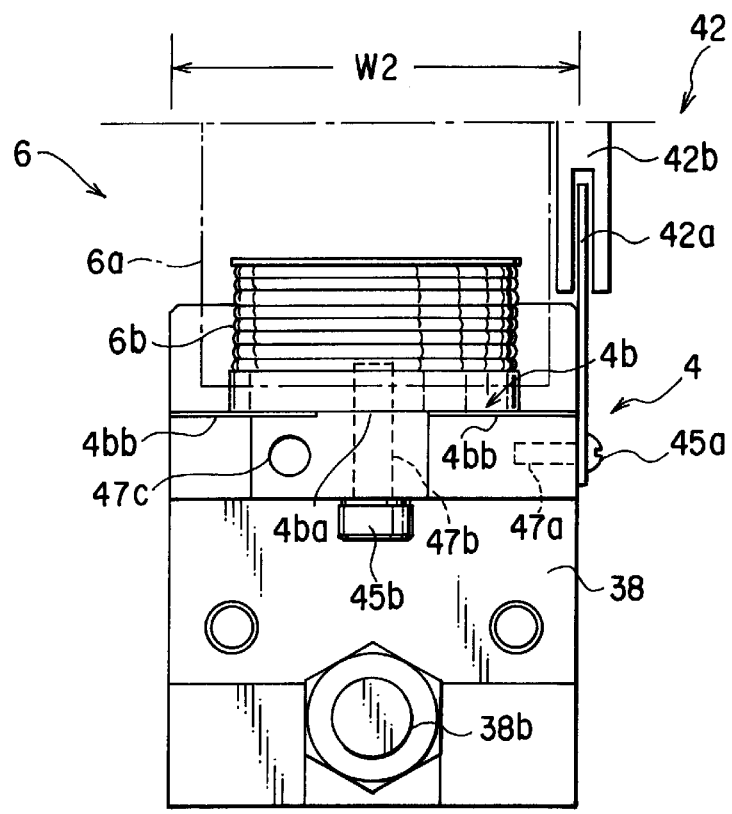
FIG. 13 is a side view showing the lever of FIG. 9.
Figure 14:
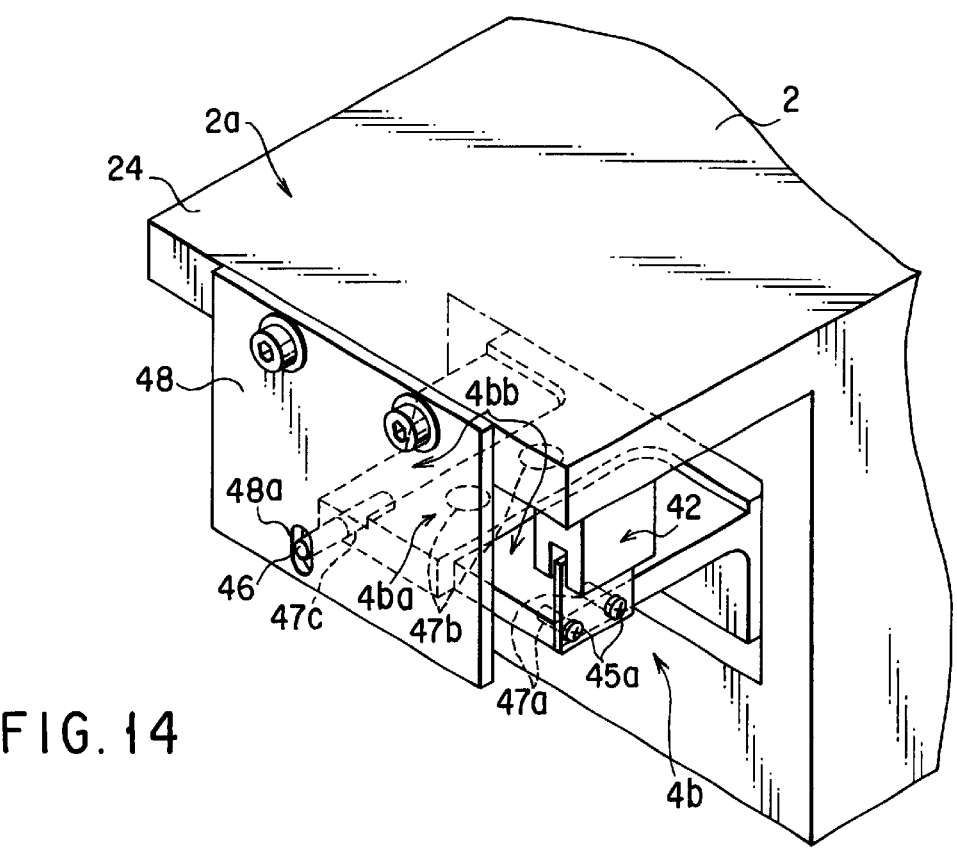
FIG. 14 is a perspective view showing the free end section of the lever of FIG. 9.
Figure 15:
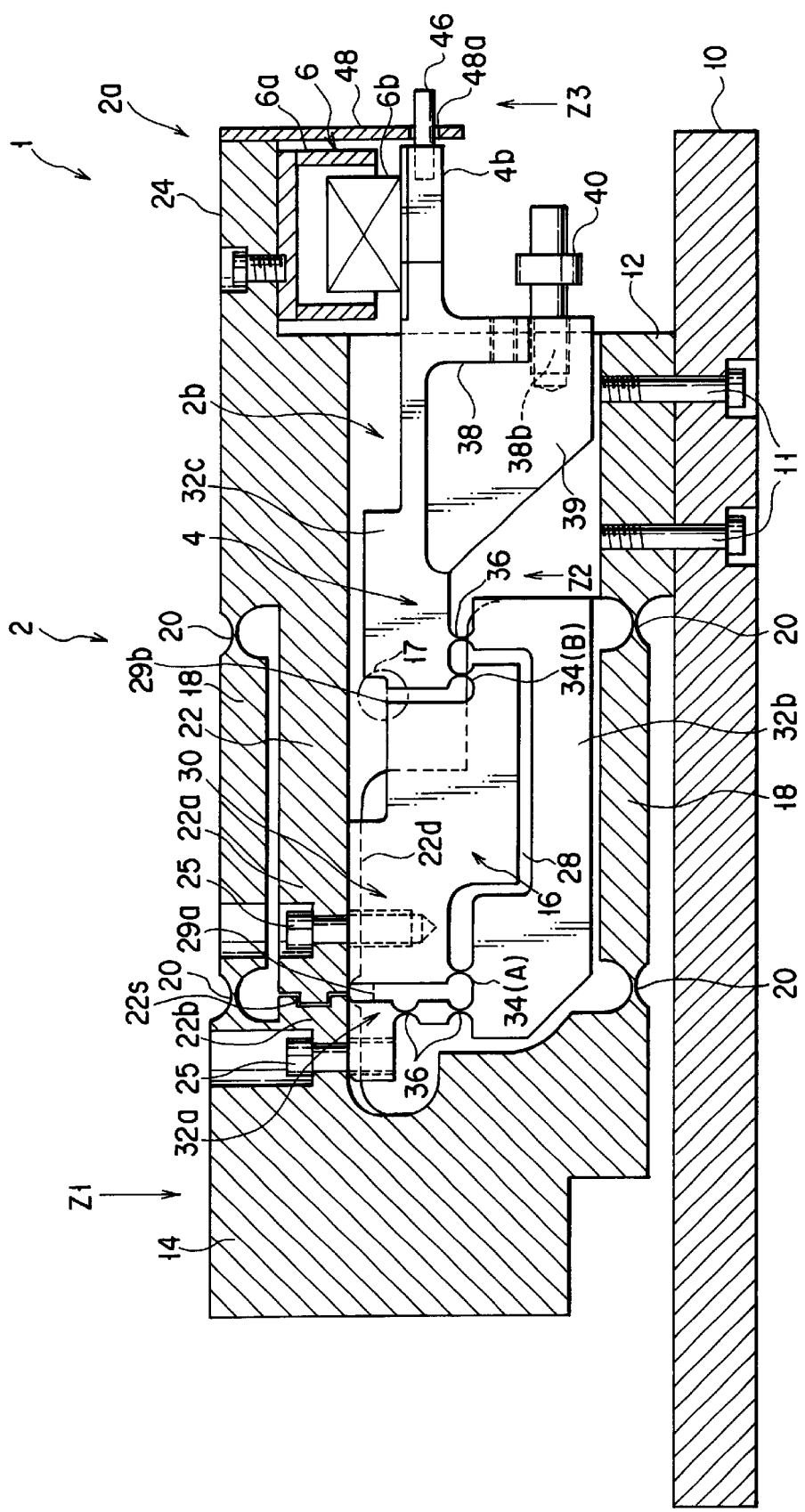
FIG. 15 is a front view, partly in cross section, showing the condition assembling the lever shown in FIGS. 11 to 14 into the Roberval's mechanism shown in FIG. 10.

FIG. 9 is a perspective view of the second embodiment of the electronic balance according to the present invention;

FIG. 10 is a front view showing the Roberval's mechanism of FIG. 9;

FIG. 11 is a front view showing the lever of FIG. 9;

FIG. 12 is a plan view showing the lever of FIG. 9;

FIG. 13 is a side view showing the lever of FIG. 9;

FIG. 14 is a perspective view showing the free end section of the lever of FIG. 9;

FIG. 15 is a front view, partly in cross section, showing the condition assembling the lever shown in FIGS. 11 to 14 into the Roberval's mechanism shown in FIG. 10;

The plan view showing the Roberval's mechanism of FIG. 9 and the sectional side view showing the Roberval's mechanism of FIG. 9 are same as FIG. 3 and FIG. 4 in the first embodiment described above.

And in FIGS. 9 to 15, the same reference characters are assigned to the same sections of the first embodiment described above and their explanation will be omitted, and the sections different from the first embodiment described above only will be discussed.

First of all, as shown in FIGS. 11 and 12, to the lever 4, bridges 29a, 29b are formed for maintaining the fixed section 30 and the mobile sections 32a and 32b in the fixing holding condition when the relevant lever 4 is being manufactured.

That is, these bridges 29a, 29b are formed with the specified thickness at two places of both open end sections (28a, 28c) of the grounded sections 28a, 28b, 28c formed in a nearly U-letter shape as seen in the front view shown in FIG. 11.

These bridges 29a, 29b are formed in a specified width, respectively, on both side sections of the lever 4 as seen in the plan view shown in FIG. 12, and provided at a total of four places.

With this bridge 29 formed, the lever 4 enters the condition in which the mobile sections 32a and 32b are fixed to the fixed section 30, thereby preventing application of unexpected loads to the spring sections 34, 36 and preventing damage to them under the component condition before the lever 4 is assembled to the Roberval's mechanism 2.

This will be discussed later but after the lever is assembled to the Roberval's mechanism 2, bridges at a total of 4 places are cut by inserting a jig from the hollow section 16, and the bridge cutting hole 17 and the mobile sections 32a, 32b and 32c are set free to move.

That is, as shown in FIG. 9, it is possible to observe that from the hollow section 16 of the Roberval's mechanism 2, one of the bridge 29a of the lever 4 is exposed.

In addition, as shown in FIG. 9, in one part of the other bridge of the lever 4, a bridge cutting hole 17 is penetrably formed by hollowing.

Furthermore, as shown in FIG. 11, the mobile section 32c on the free end 4b side of the lever 4 is formed in a plate shape with a specified length but on the bottom surface in the mid-position of the mobile section 32c, a reinforcement piece 38 of a specified thickness (corresponding to the weight mounting piece 38 of the first embodiment described above) is protrudably formed downwards along the width direction of the lever 4.

From the center section to the base end section side of the protruding piece 38, a reinforcement piece 39 with a specified thickness is continuously formed at the center along the extending direction (from the base end section to the free end) of the lever 4.

These reinforcement pieces 38, 39 are formed in a nearly T-letter shape as viewed in the plan view shown in FIG. 12.

The bottom surface of this reinforcement piece 39 is made into a tilted surface 39a that tilts towards the bottom end of the reinforcement piece 38 as shown in FIG. 11 so that the mobile section 32c can be reinforced with the minimum amount of material.

These reinforcement pieces 38, 39 are formed in a nearly T-letter shape as viewed in the plan view shown in FIG. 12 as described before so that the weight of the mobile section 32c is reduced while the specified rigidity is maintained.

In addition, to the nearly horizontal screw hole 38b section formed on this reinforcement piece 39, a balancing weight 40 same as that of the first embodiment discussed before is slidably mounted in the horizontal direction (see FIG. 9).

As is the case of the perspective view shown in FIG. 14, to the free end 4b of the lever 4, a pin member 46 extending in the longitudinal direction (L) is mounted.

To the protruding piece 24 of the Roberval's mechanism 2 located immediately above the free end 4b of this lever 4, a restricting plate 48 of restricting means is equipped.

Since this restricting plate 48 is mounted to the fixed section 12 side of the Roberval's mechanism 2 shown in FIG. 9, it does not participate in the travel of the Roberval's mechanism 2.

Consequently, this restricting plate 48 may be fixed to the base plate 10 side shown in FIG. 9.

In addition, to the restricting plate 48, an inserting hole 48a for inserting a pin member 46 shown in FIG. 14 is formed.

This inserting hole 48a is formed in such a manner that the mobile range of the pin member 46 freely inserted achieves the specified range.

By this, the free end 4b of the lever 4 is allowed to move in the specified range, and the lever 4 travel that would break the mobile sections (springs 34, 36) of the lever 4 is restrained.

In addition, as shown in FIG. 13, the detection plate 42a of the position detection sensor 42 and the coil 6b of balance driving means 6 are fixed to the free end 4b of the lever 4 by the use of screws 45 (45a, 45b).

In such event, the material of the lever 4 is aluminum, while the material of screws 45 and pin member 46 is stainless steel.

To the free end 4b, the screw holes 47 (47a, 47b) for fixing the screw 45 and the screw hole (may be a press-fitting hole) 47c of the pin member 46 are formed.

Now, the fixed surface 4ba for fixing the coil 6b at the free end 4b of the lever 4 is formed linearly along the length direction of the lever 4, and the stepped surface 4bb is formed to have a lower height with respect to the plane position of the fixed surface 4ba.

The above-mentioned screw holes 47 (47a, 47b) are all formed on this stepped surface 4bb.

FIG. 15 is a front view, partly in cross section, showing the assembly condition of the electronic balance according to the second embodiment.

In such event, to the lever 4, a bridge 29 formed at the time of manufacture is left, and since the fixed section 30 and the mobile sections 32a and 32b of the lever 4 are linked by this bridge 29, the lever 4 can be mounted to the Roberval's mechanism 2 with the sizes of the fixed section 30 and the mobile sections 32a and 32b maintained.

In addition, since unwanted force is applied to the spring sections 34, 36 by the presence of the bridge 29 while the lever 4 in the component condition is carried in and is assembled to the Roberval's mechanism 2, damage to the spring sections 34, 36 can be prevented.

And as is the case of the first embodiment discussed above, the fixed section 30 of the lever 4 is fixed to the fixed side 22a of the lever fixed section 22 of the Roberval's mechanism 2 and the mobile section 32 of the lever 4 is fixed to the mobile side 22b of the lever fixed section 22.

After completing the fixing, the bridge 29 of the lever 4 is cut.

This cutting takes place by cutting bridges 29a, 29b at a total of 4 places from the front and the rear sides using a cutting jig (for example, pliers, etc.) from the hollow section 16 and the bridge cutting hole 17 penetrably formed on the front and the rear side of the Roberval's mechanism 2.

By this cutting, the mobile section 32a of the lever 4 is set free to move (measurable).

In FIG. 15, bridges 29a, 29b are shown with a broken line for convenience.

As is the case of the first embodiment described before, because applying force from the free end 4b side of the lever 4 can increase the force to be transmitted to the mobile sections 32a, 32b and 32c side (mobile section 14 side of the Roberval's mechanism 2), braking is applied to the lever 4 with a small force applied to the free end 4b side of the lever 4.

By this, the pin member 46 mounted at the free end 4b of the lever 4 can be moved by the travel range opened in the inserting hole 48a of the restricting plate 48, and with this small pin member 46, breakage of the mobile sections (springs 34, 36) can be prevented while restricting the travel of the whole lever 4.

Now, in the lever 4, screw 45 and the pin member 46 are screwed down to the screw hole 47, but even when the stainless steel screw 45 side is thermally expanded by changes, etc. of the atmospheric temperature, the plane position of the fixed surface 4ba of the aluminum lever 4 is not varied.

That is, when the screw 45 side is thermally expanded, the lever 4 expands at the stepped surface 4bb portion via the screw hole 47, but since this stepped surface 4bb is formed one step lower with respect to the fixed surface 4ba, the plane position of the fixed surface 4ba does not vary.

In addition, because balance driving means 6 is to move the free end 4b (coil 6b) side of the lever 4 in the height direction and detects the balance position of the lever 4 based on the relative position of the fixed magnetic material 6a, when any variations and inclination are generated in the height position on the coil 6b side, influence is generated in that the control current required for obtaining the same travel amount is varied.

However, as by the above configuration, the plane position of the fixed surface 4ba (coil 6b) is unchanged with respect to the height direction, the control current for moving the lever 4 to the balance position by balance driving means 6 is not varied, and the driving characteristics can be maintained to be constant.

By the electronic balance according to the second embodiment of the present invention as is the case of the first embodiment described above, since the Roberval's mechanism and the lever is made separately and the fulcrums are equipped to the lever, high-accuracy measurement is enabled with the attenuation amount of the specified force achieved.

In addition to this, in the electronic balance according to the second embodiment of the present invention, since a bridge for linking and fixing is mounted to the lever across the lever fixed section and the mobile section and the bridge is cut after the lever is assembled to the Roberval's mechanism, the lever can be mounted to the Roberval's mechanism with the size of each lever section maintained, achieving easy assembly as well as improving the assembly accuracy.

Furthermore, because in the electronic balance according to the second embodiment, the lever in the component condition has the mobile section fixed and held to the fixed section, damage to the spring section can be prevented, and easy handling of parts can be achieved.

In the electronic balance according to the second embodiment of the present invention, to the free end of the lever, balance driving means, position detection sensor, lever travel restricting means, etc. are provided, but of these, mounting balance driving means to the one-step higher fixed surface and others to the stepped surface can prevent the plane position of the fixed surface from varying in the lever displacement direction even if the fixing member is thermally expanded and the stepped surface is subject to the expansion.

By this, in the electronic balance according to the second embodiment of the present invention, balance driving means can be free of variations and tilting in the fixing height position, and the driving characteristics can be made constant without generating variations in the control current, and the stable control for balancing the lever can be achieved.

In addition, in the electronic balance according to the second embodiment, by reinforcing the lever with the first and the second reinforcement pieces which cross each other at right angles and are protrudably formed, the lever can possess the specified rigidity and can be downsized and can reduce weight even if it is not made from the aluminum block material.

Furthermore, in the electronic balance according to the second embodiment, by reducing the size and the weight of the lever, reactions of lever travel against the load can be made more sensitive, enabling the improvement of the weighing accuracy.

(Third Embodiment)

Figure 16:
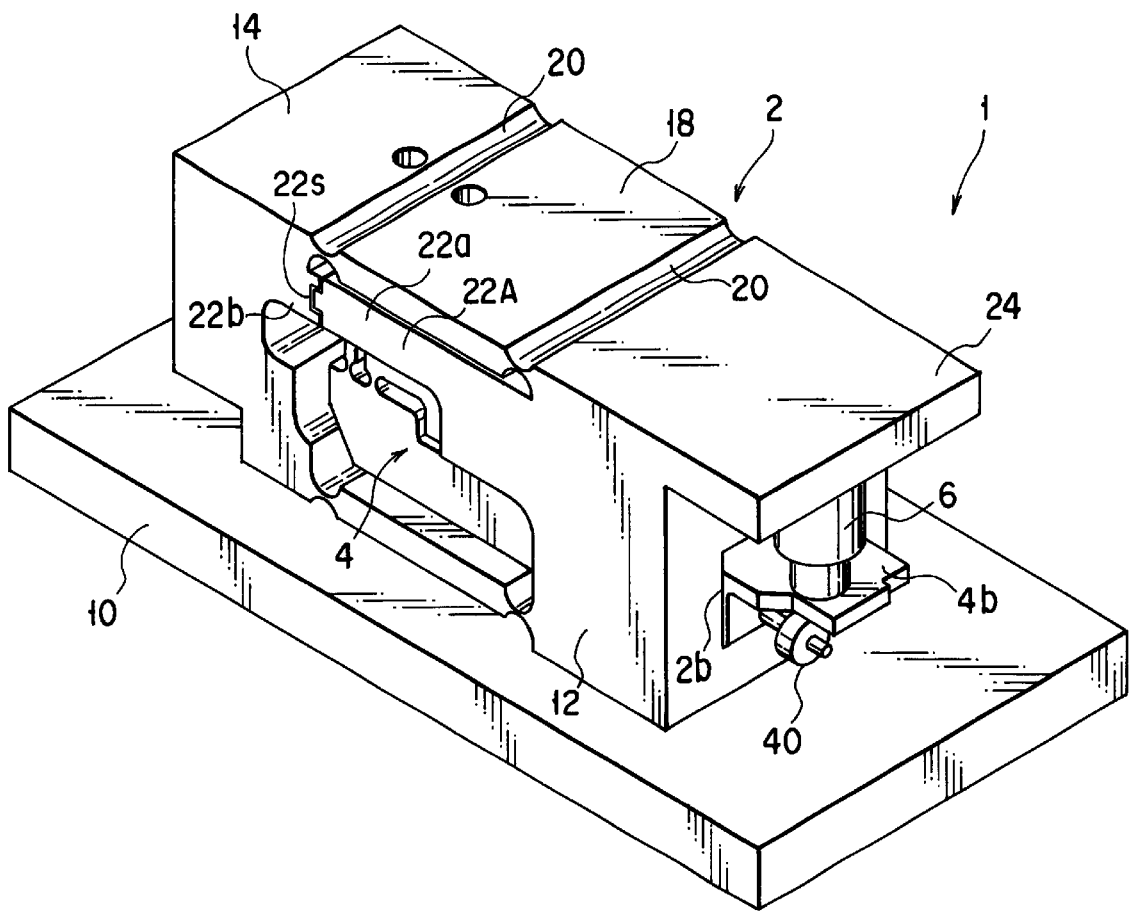
FIG. 16 is a perspective view of the third embodiment of the electronic balance according to the present invention.
Figure 17:
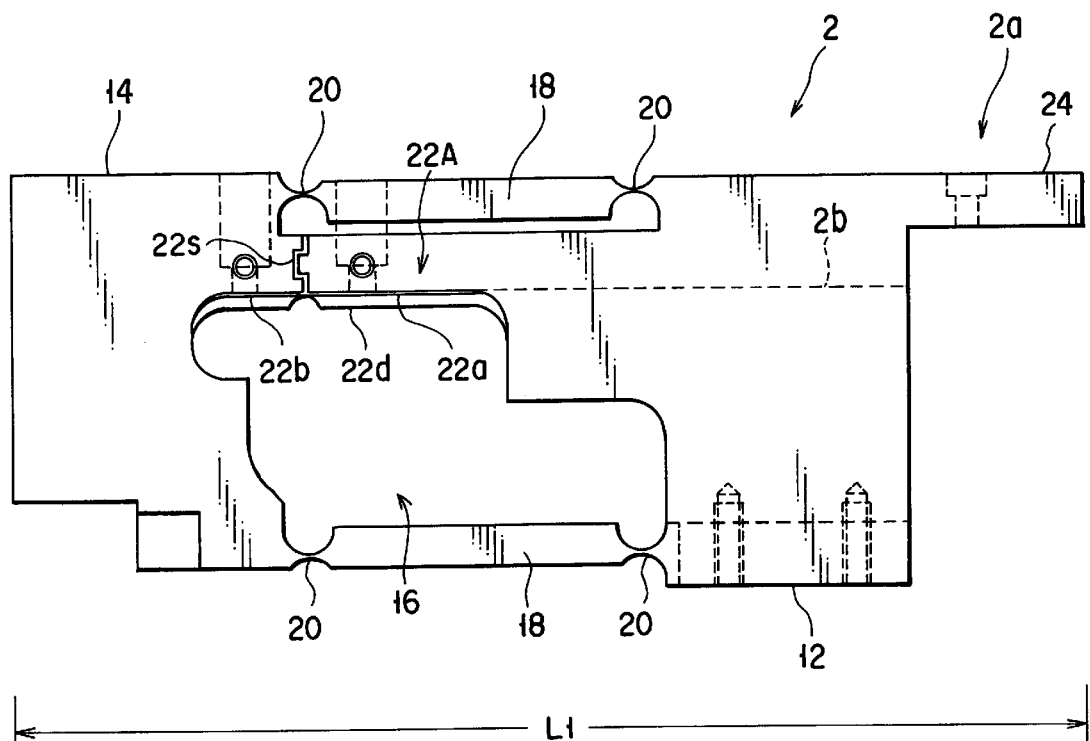
FIG. 17 is a front view showing the Roberval's mechanism of FIG. 16.
Figure 18:
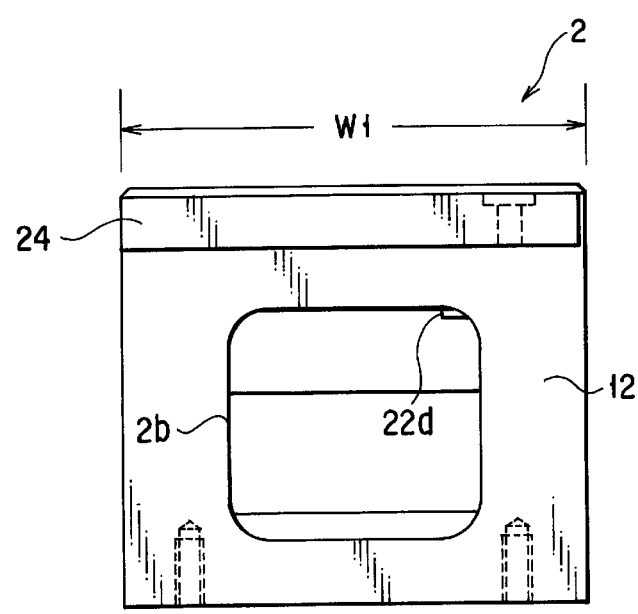
FIG. 18 is a sectional side view of the Roberval's mechanism of FIG. 16.
Figure 19:
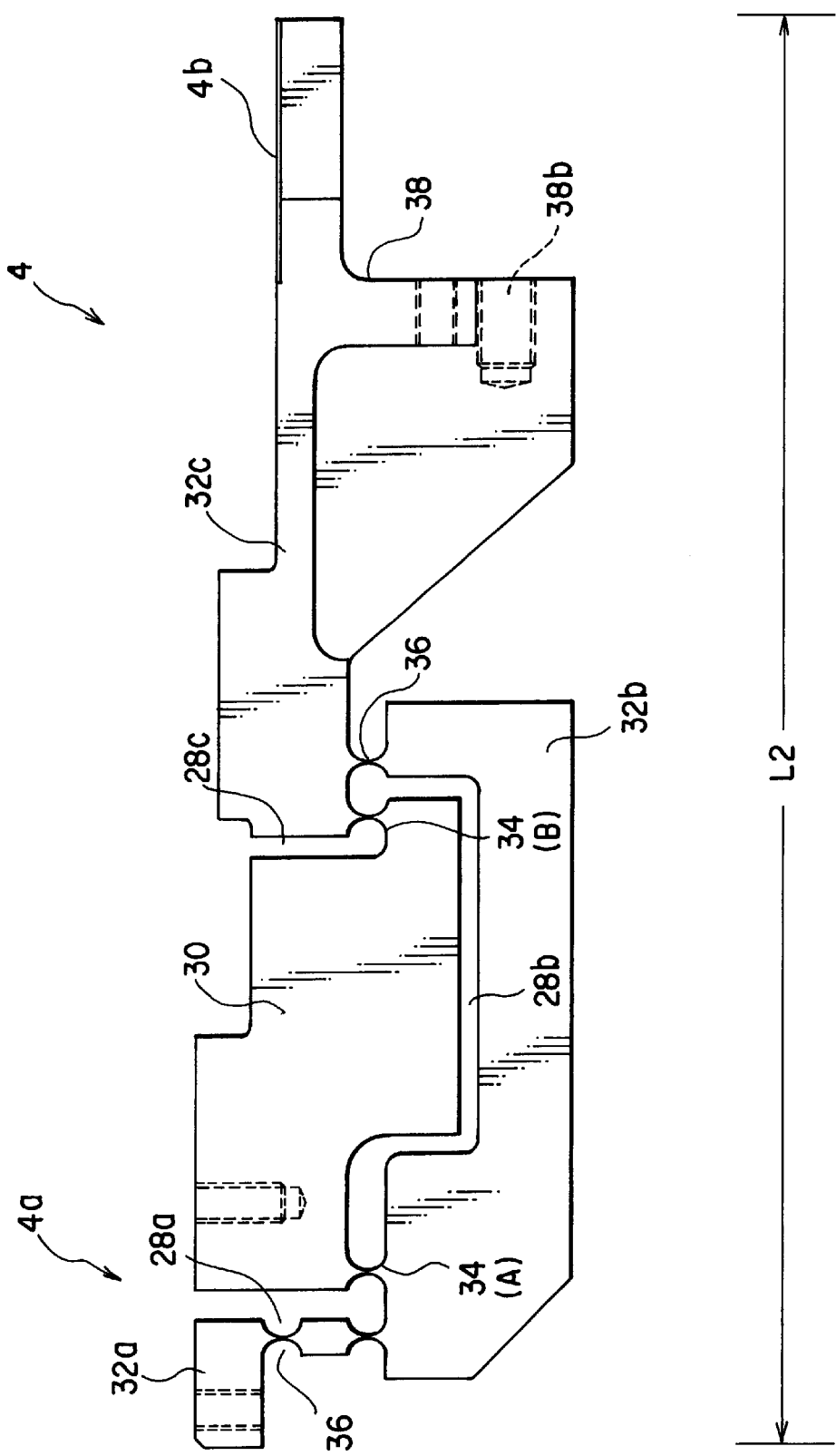
FIG. 19 is a front view showing the lever of FIG. 16.
Figure 20:
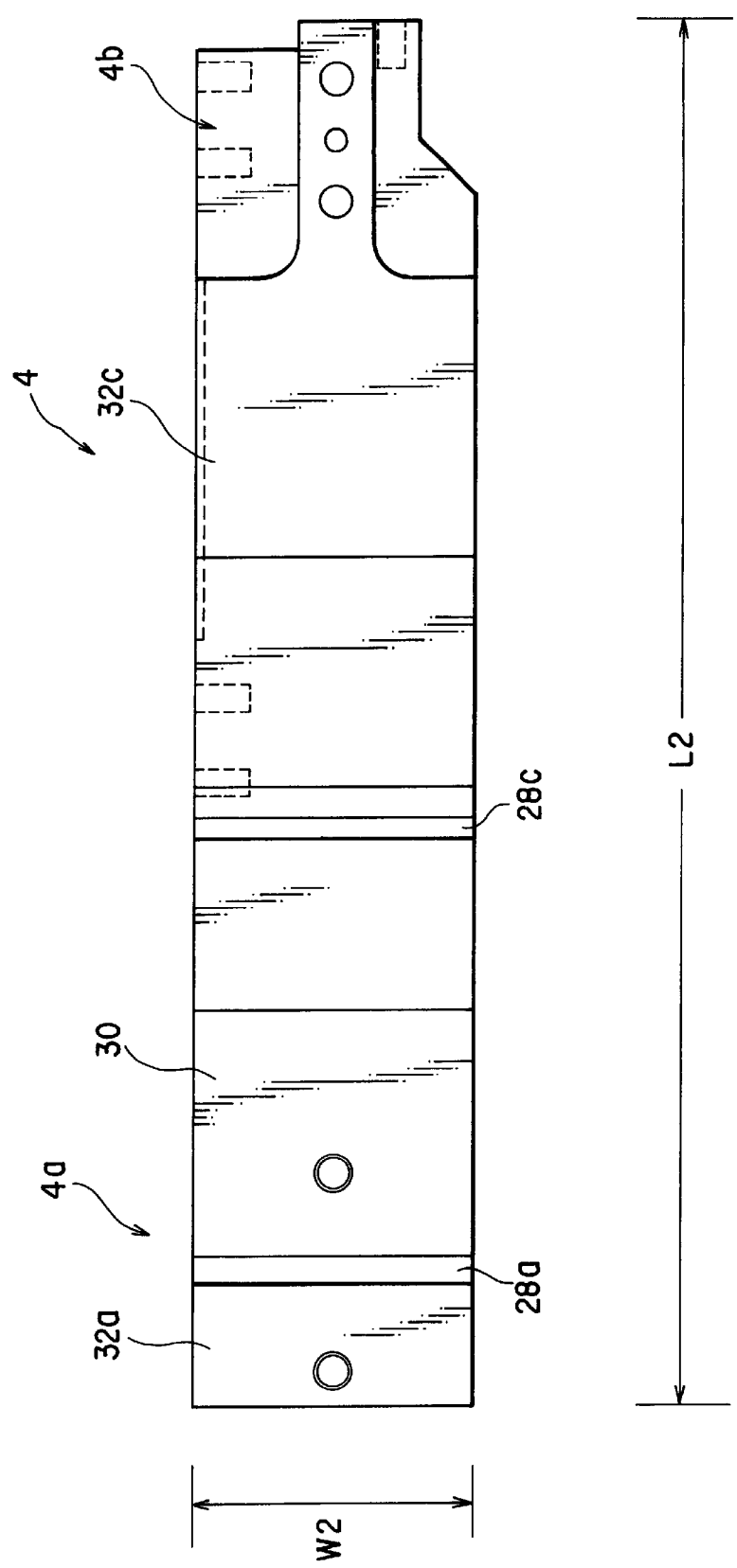
FIG. 20 is a plan view showing the lever of FIG. 16.
Figure 21:
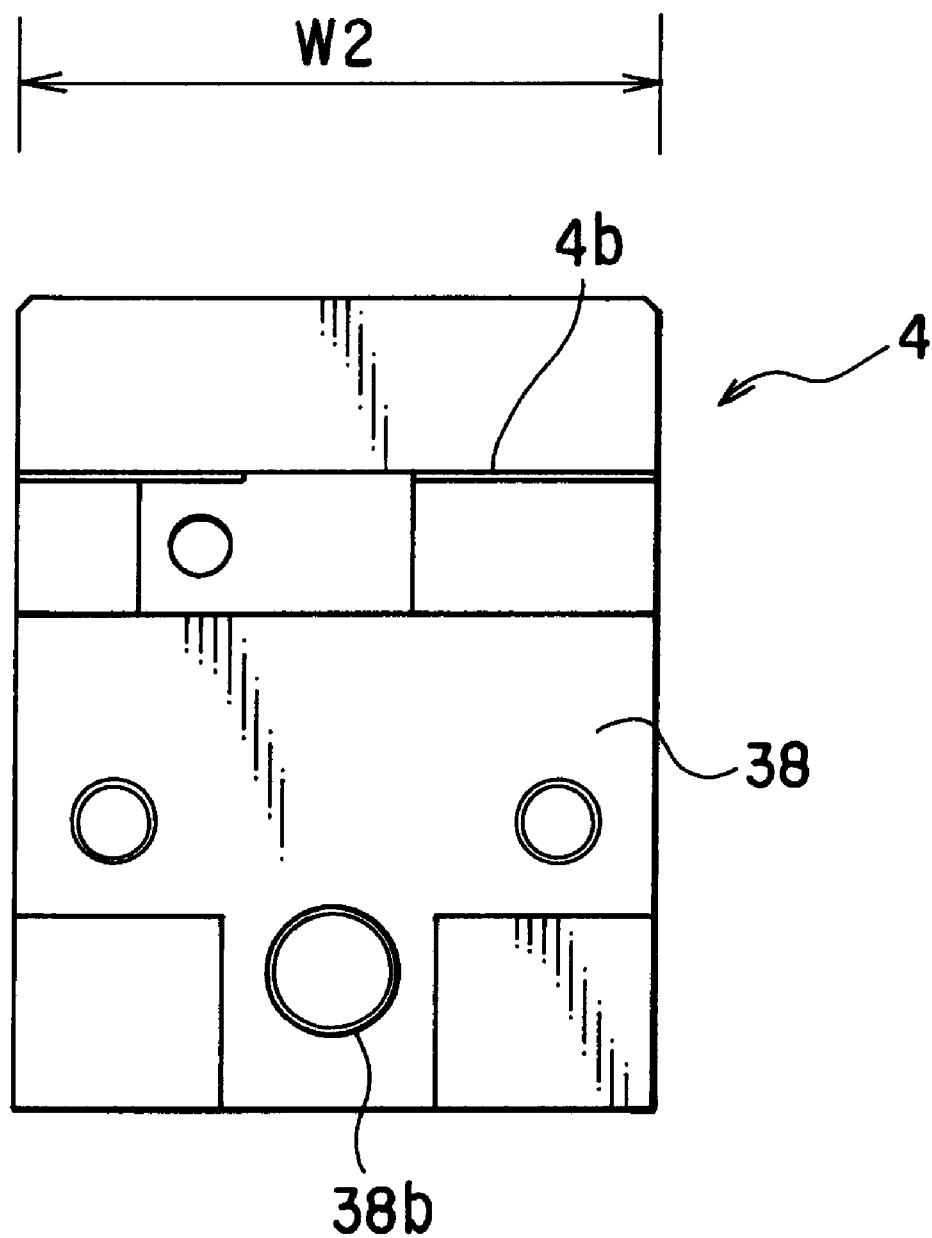
FIG. 21 is a side view showing the lever of FIG. 16.
Figure 22:
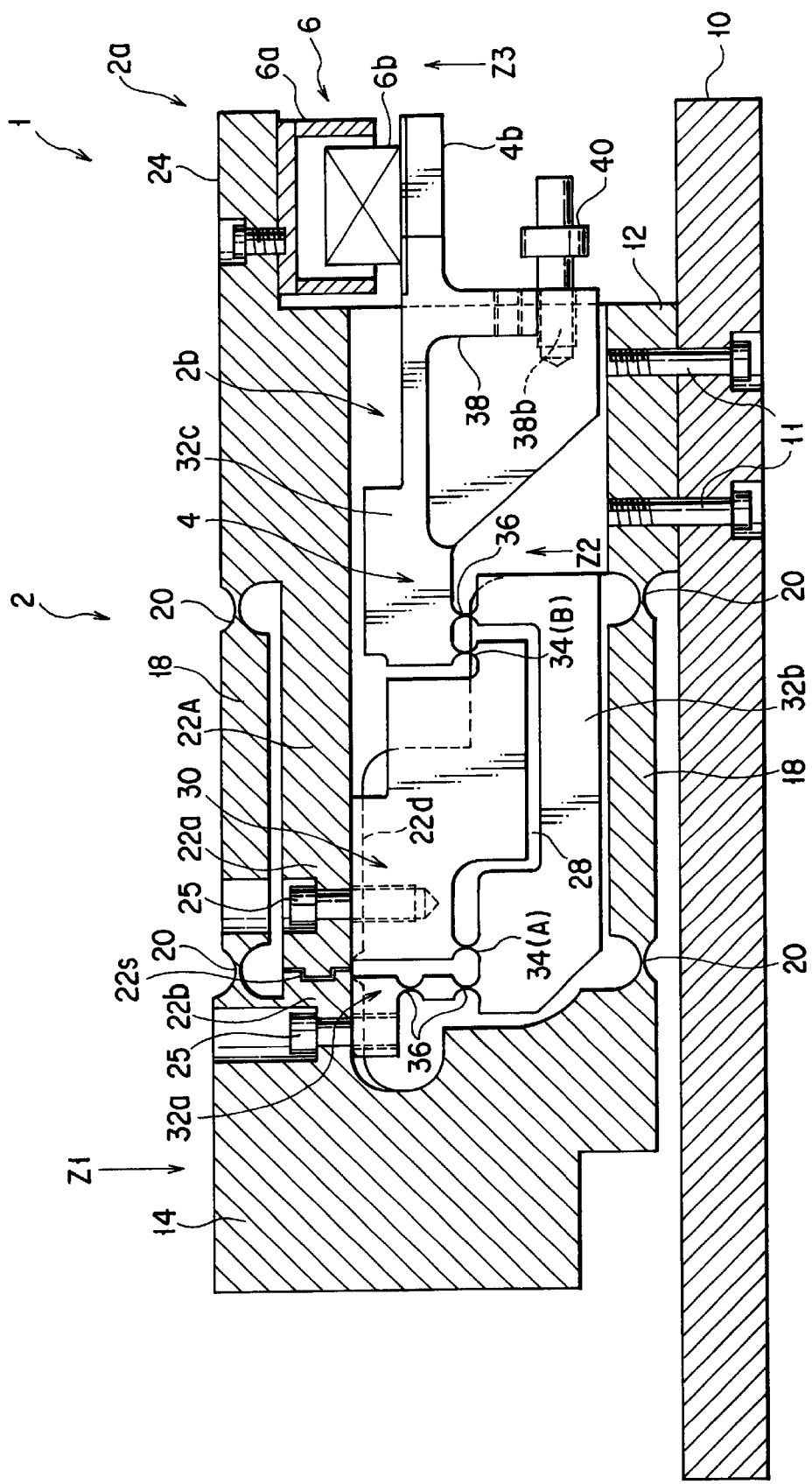
FIG. 22 is a front view, partly in cross section, showing the condition assembling the lever shown in FIGS. 19 to 21 into the Roberval's mechanism shown in FIGS. 17 and 18.
Figure 23:
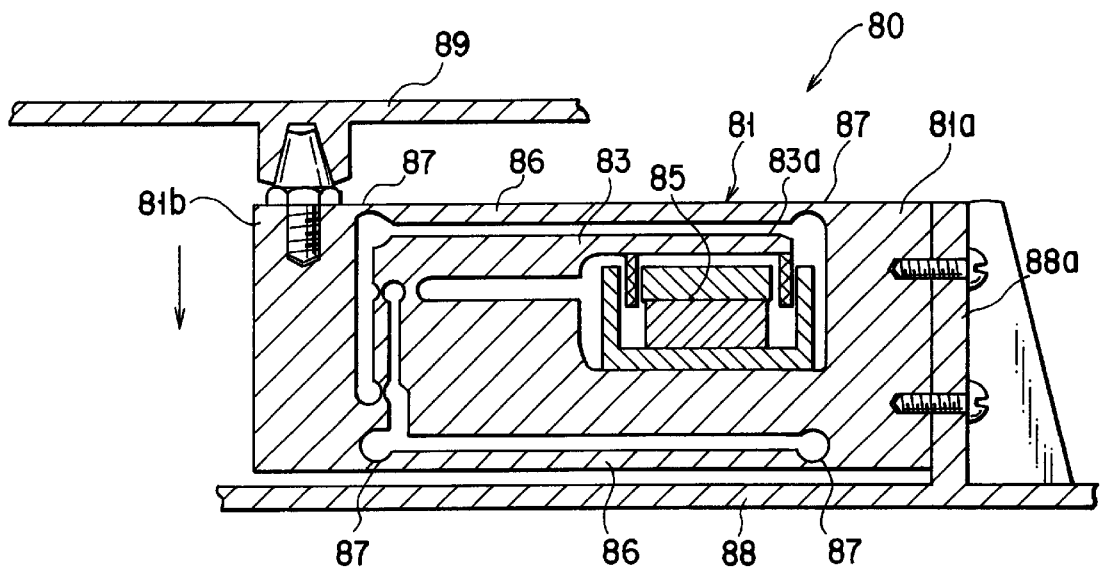
FIG. 23 is a front cross-sectional view showing the first conventional electronic balance.
Figure 24:
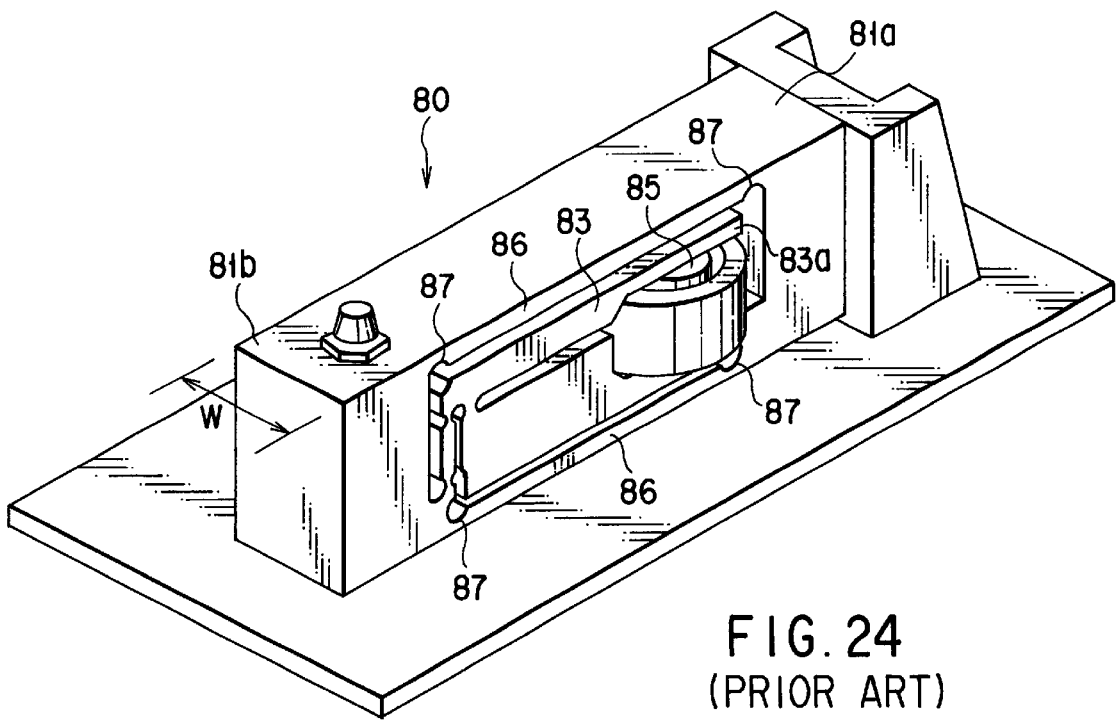
FIG. 24 is a perspective view showing the first conventional electronic balance.
Figure 25:
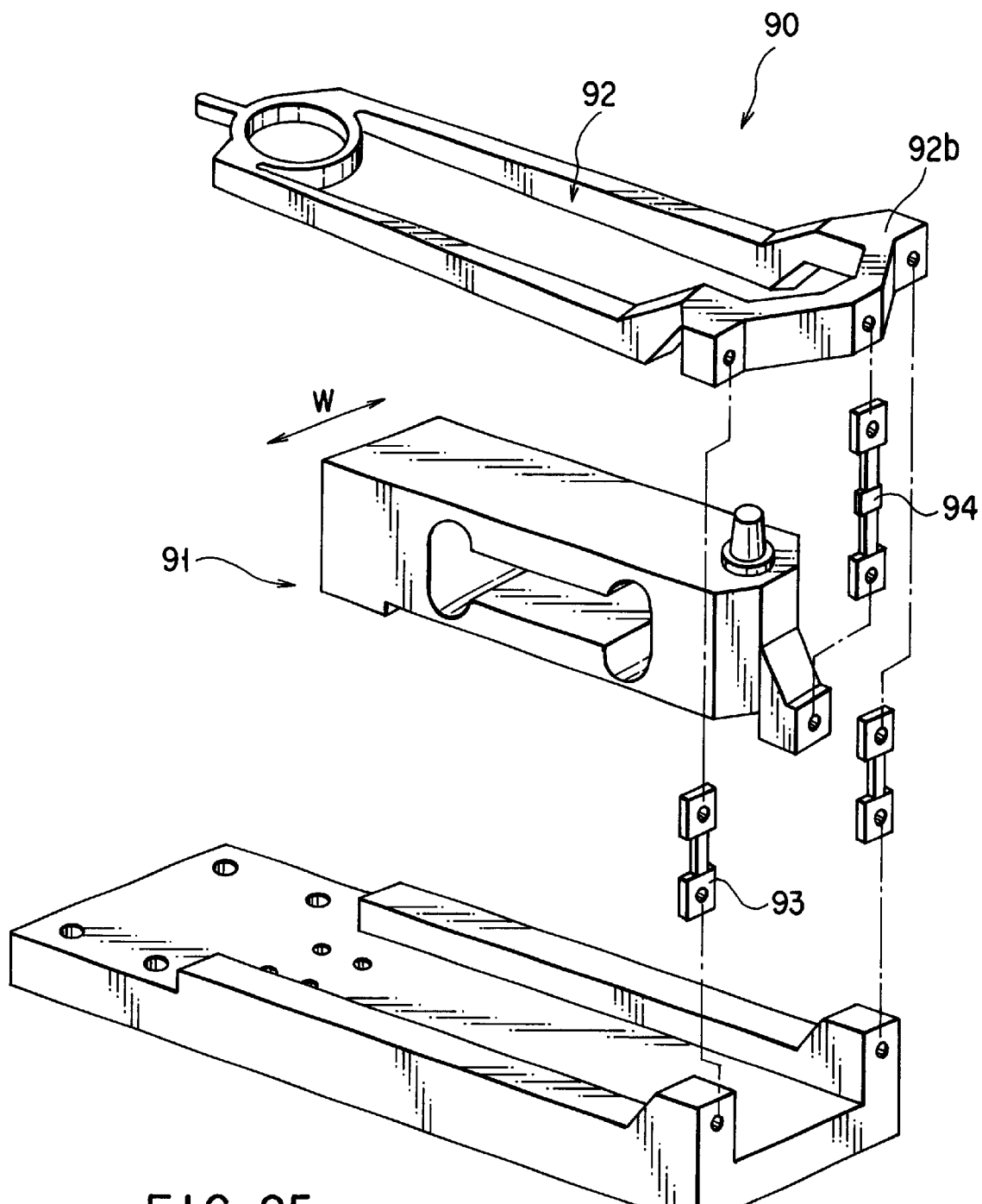
FIG. 25 is an exploded perspective view showing the second conventional electronic balance.
Figure 26:
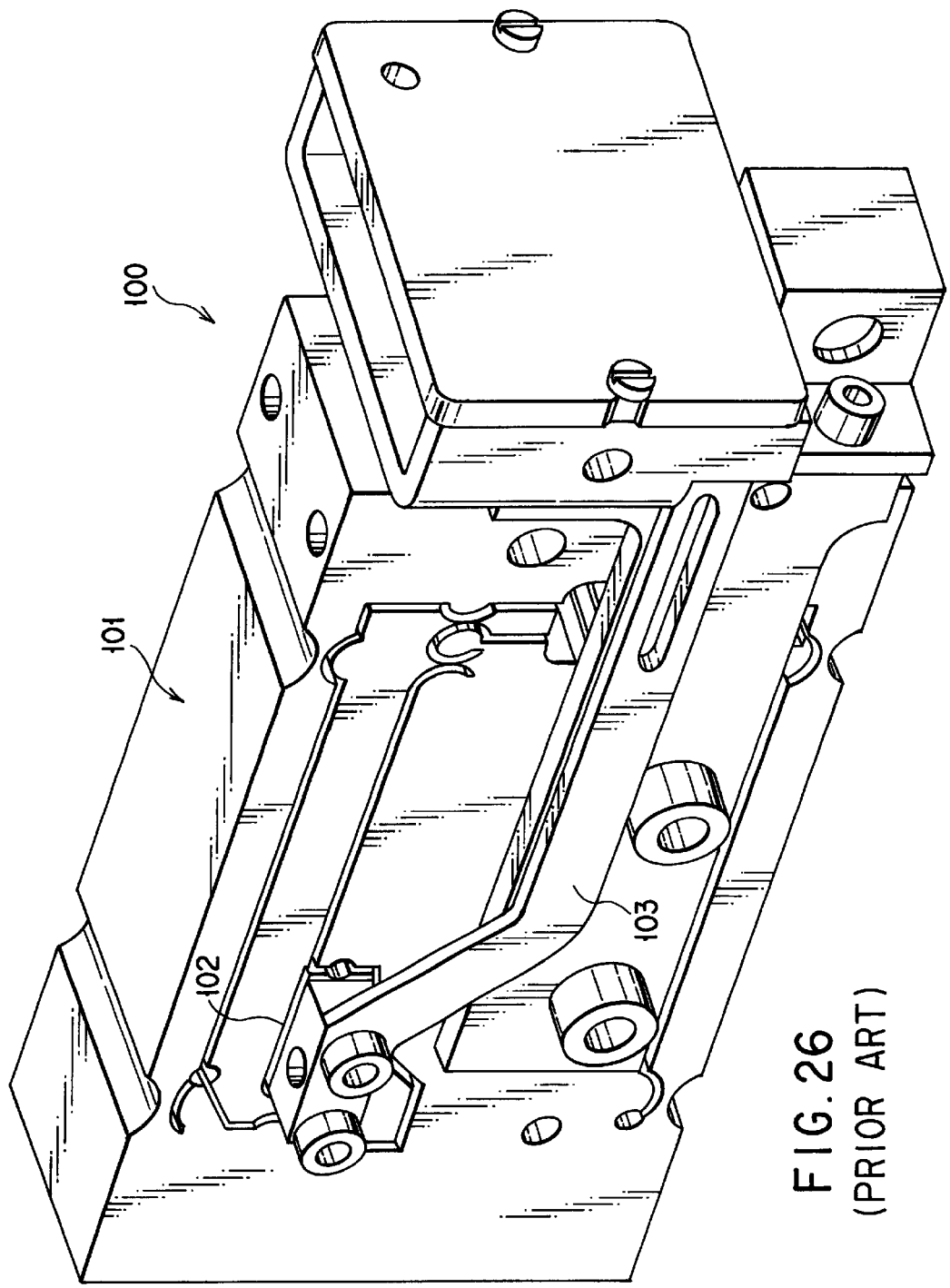
FIG. 26 is a perspective view showing the third conventional electronic balance.

FIG. 16 is a perspective view of the third embodiment of the electronic balance according to the present invention;

FIG. 17 is a front view showing the Roberval's mechanism of FIG. 16;

FIG. 18 is a sectional side view of the Roberval's mechanism of FIG. 16;

FIG. 19 is a front view showing the lever of FIG. 16;

FIG. 20 is a plan view showing the lever of FIG. 19;

FIG. 21 is a side view showing the lever of FIG. 19;

FIG. 22 is a front view, partly in cross section, showing the condition assembling the lever shown in FIGS. 19 to 21 into the Roberval's mechanism shown in FIGS. 17 and 18;

The plan view showing the Roberval's mechanism of FIG. 16 is same as FIG. 3 in the first embodiment described above.

And in FIGS. 16 to 22, the same reference characters are assigned to the same sections of the first and the second embodiment described above and their explanation will be omitted, and the sections different from the first and the second embodiments described above only will be discussed hereunder.

First of all, as shown in FIG. 16, the position in the hollow section 16 of the Roberval's mechanism 2 and immediately below the upper Roberval's section 18, a restricting section is formed.

This restricting section is formed by hollowing the solid aluminum block material from the front side together with the Roberval's mechanism.

Specifically, for this restricting section, a beam section 22A (corresponding to the lever fixed section 22 of the first embodiment described above) is formed continuously in such a manner to be parallel with the Roberval's section 18 and link the fixed section 12 to the mobile section 14 in the longitudinal direction (L1) at the hollow section when the fixed section 1, mobile section 14, Roberval's section 18, and spring section 20 are formed.

And to this beam section 22A, a restricted interval section 22s cut in the line form towards the width W1 direction at specified intervals (for example, about 0.1 mm to 0.4 mm) is formed.

By the cutting that forms this restricted interval section 22s, the beam section 22A that links the fixed section 12 and the mobile section 14 is divided into the fixed side 22a and the mobile side 22b.

The restricted interval section 22s is cut in such a manner that the lateral protruded pattern and the lateral recessed pattern fit into each other as shown in FIGS. 16 and 17.

By this, the restricted interval section 22s restricts the vertical travel of the mobile side 22b with respect to the fixed side 22a by as much as the interval.

This restricted interval section 22s is not limited to the profile such as lateral protruded pattern and lateral recessed pattern but, for example, fit between lateral V-letter patterns, fit between lateral U-letter patterns, or any others that have a configuration for restricting the vertical travel of the mobile side 22b with respect to the fixed side 22a are acceptable.

To the beam section 22A divided into the fixed side 22a and the mobile side 22b as descried above, the lever 4 is fixed in the same manner as descried above.

That is, to the fixed side 22a of the beam section 22A, the fixed section 30 of the lever 4 as shown in FIGS. 19 to 21 is fixed, and to the mobile side 22b of the beam section 22A, the mobile section 32a of the lever 4 as shown in FIGS. 19 to 21.

The beam section 22A is parallel to the Roberval's section 18 and the lever 4 is fixed for the lever 4 to achieve parallelism with the Roberval's section 18.

In addition, the lever housing section 2b of the Roberval's mechanism 2 is formed on the bottom surface in the same manner as that of the first embodiment discussed before.

FIG. 22 is a front view, partly in cross section, showing the condition assembling the electronic balance according to the third embodiment.

FIG. 22 shows, for convenience, the lever 4 not broken away but the Roberval's mechanism only in the broken away condition.

This electronic balance 1 is configured by inserting and fixing the lever 4 into the lever housing section 2b of the Roberval's mechanism 2.

Now, for the Roberval's mechanism 2, the fixed section 12 is fixed to the base plate 10 with screws 11.

For the lever 4 with the lever 4 inserted in the lever housing section 2b of this Roberval's mechanism 2, the base end section 4a is fixed to the beam section 22A.

On the bottom surface of the beam section 22 that forms the lever housing section 2b of the Roberval's mechanism 2, a stepped section 22d that guides the one side surface of the lever 4 is formed along the longitudinal direction (L1) as shown in FIGS. 17 and 18.

By this, positioning when the lever 4 is inserted in the lever housing section 2b of the Roberval's mechanism 2 is made easy and assembly can be carried out easily.

And the fixed section 30 of the lever 4 is fixed to the fixed side 22a of the beam section 22A and the mobile section 32a of the lever 4 is fixed to the mobile side 22b of the beam section 22A.

Under this fixed condition, the free end 4b of the lever 4 protrudes to the one end side 2a of the Roberval's mechanism 2 and is located immediately below the protruded piece 24.

In this way, by equipping the lever 4 inside the Roberval's mechanism 2, the electronic balance can be downsized as a whole.

In the electronic balance 1 configured in this way, as described above, the Roberval's mechanism 2 has a hollow section 16 penetrably formed by hollowing a solid block material such as aluminum, etc. and thin-wall spring sections 20 formed on both ends of a pair of parallel Roberval's sections 18 that have a specified thickness at the top and bottom.

Furthermore, in the hollow section 16, a restricted interval section 22s for dividing the beam section 22A parallel with the Roberval's section 18 and continuously formed in such a manner to link the fixed section 12 to the mobile section 14 to the fixed side 22a and the mobile side 22b is disposed.

The restricted interval section 22s restricts the vertical travel of the mobile side 22b with respect to the fixed side 22a by as much as the interval.

Consequently, since the Roberval's mechanism 2 has the travel of the mobile section 14 with respect to the fixed section 12 restricted to a specified range by the restricted interval section 22s, the spring section 20 can be protected because the fixed section 12 and the mobile section 14 do not move in the range that would damage each of thin-wall spring section 20 even if any vibration or impact is applied from the outside during transportation.

In addition, even when the lever 4 is assembled to the Roberval's mechanism 2 or the Roberval's mechanism 2 is assembled to fix to the base plate 10, the spring section 20 can be protected because the fixed section 12 and the mobile section 14 do not move in the range that would damage each of thin-wall spring section 20 by the restricted interval section 22s.

Furthermore, in the present embodiment, to the fixed side 22a and the mobile side 22b of the beam section 22A that form the restricted interval section 22s, the fixed section 30 and the mobile section 32a of the lever 4 are linked and fixed, respectively.

By this, since the impact load is not applied to the spring section 20 by the restricted interval section 22s and at the same time, the impact load is not applied to the mobile sections 32a, 32b and 32c side of the lever 4, even if unexpected substance falls on the mobile section 14 side of the Roberval's mechanism 2 while in service, the spring section 20 as well as spring sections 34, 36 that form the lever 4 can be protected.

By the electronic balance according to the third embodiment of the present invention, it is possible to protect the spring sections because the fixed section and the mobile section do not move in the range that would damage the thin-wall spring sections even if any vibration or impact is given from the outside during transportation because a restricting section (restricted clearance section) that forms a clearance for restricting the travel range of the mobile section between the fixed section and the mobile section with respect to the Roberval's mechanism comprising a pair of Roberval's sections with a specified length via thin-wall spring sections between the fixed section and the mobile section by hollowing a solid metal block material.

By the electronic balance according to the third embodiment of the present invention, it is possible to protect the spring section because the fixed section and the mobile section do not move the range that would damage the thin-wall spring sections by the restricting section (restricted clearance section) even when unexpected load is about to be applied to the spring section while the Roberval's mechanism is being assembled.

By the electronic balance according to the third embodiment of the present invention, it is possible to protect the spring sections as well as the mobile section of the lever because the spring section is not subject to the impact load by the restricted section (restricted interval section) and the lever mobile section side is not subject to the impact load, even when any unexpected substance falls on the mobile section side of the Roberval's mechanism while the electronic balance is in service, by dividing the restricting section (restricted interval section) into the fixed side and the mobile side by cutting the beam section that link the fixed section an the mobile section of the Roberval's mechanism and linking to fix the fixed section and the mobile section of the lever to this fixed side and the mobile side, respectively.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic balance comprising:
   a Roberval'S mechanism including:
      a fixed section formed on a side in a longitudinal direction (L1) of a first metal block material which is rectangular and has a length of L1 and a width of W1, forming a hollow sect ion having a predetermined shape and penetrating the first metal block material from a front surface side to a rear surface side of the first metal block material;
      a mobile section formed on another side in the longitudinal direction (L1) of the first block material and movable in a vertical direction with respect to the fixed section upon receiving a load of a substance to be weighed;
      a pair of upper and lower parallel Roberval's sections which have substantially the same length so as to link the fixed section and the mobile section in upper and lower regions respectively in the longitudinal direction (L1) of the first metal block material, each of the pair of upper and lower parallel Roberval's sections has a predetermined thickness;
      a lever fixed section formed under the upper parallel Roberval's section and in parallel with the upper and lower parallel Roberval's sections, in the longitudinal direction (L1) of The first metal block material;
      a plurality of thin-wall spring sections formed at ends of the upper and lower parallel Roberval's sections respectively, in the longitudinal direction (L1) of the first metal block material; and a substantially rectangular lever housing section formed on a bottom surface of the lever fixed section from a center section of one side surface of the fixed section of the Roberval's mechanism toward an inside of the Roberval's mechanism, such that the rectangular lever housing section is open from a side surface side of the first metal block material to The hollow section to reach a mobile section side; and a lever including;

a base end section formed at one end in a longitudinal direction (L2) of a second metal block material by forming a substantially U-shaped grounded section penetrating the second metal block material from a front surface side to a rear side surface of the second metal block material, the second metal block material having a length L2 which substantially corresponds to a distance from a deepest portion of the lever housing section to a distal end portion, and a width W2 which is smaller than the width of W1 of the first metal block material of the Roberval's mechanism and a diameter of an opening of the lever housing section;

a free end section formed at another end in the longitudinal direction (L2) of the second metal block material;

a fixed section formed between the base end section and the free end section, along the longitudinal direction (L2) of the second metal block material;

a plurality of mobile sections formed at both sides and a lower surface of the fixed section in the longitudinal direction (L2) of the second metal block material;

one or more fulcrums which are respectively provided at both end sides of the substantially U-shaped grounded section in the longitudinal direction (L2) of the second metal block material and link the fixed section and the mobile sections; and one or more thin-wall spring sections which are provided in respective positions to correspond to said one or more fulcrums along the longitudinal direction (L2) of the second metal block material, and connect the fixed section and the mobile sections to transmit a force therebetween, wherein the lever is inserted through the opening of the lever housing section of the Roberval's mechanism, housed in the lever housing section, and fixed to the ever fixed section of the Roberval's mechanism, with the free end section of the lever extended to an external portion of the Roberval's mechanism.

2. An electronic balance according to claim 1, wherein when the lever moves up and down the free end section by moving the mobile sections of the lever in synchronism with motion of the mobile section of the Roberval's mechanism, a force acting downward on the Roberval's mechanism is changed to a-force acting on the Roberval's mechanism in a horizontal direction toward the free end of the lever by said one or more fulcrums, and further the force acting on the Roberval's mechanism in the horizontal direction is changed to a force acting upward by the free end section of the lever by said one or more fulcrums, thereby reducing mass (load) of the substance which acts on the mobile section of the Roberval's mechanism by a predetermined amount, and then allowing the mass to be transmitted to the free end section of the lever.

3. An electronic balance according to claim 1, wherein the Roberval's mechanism further comprises a fixed side and a mobile side, which are formed at the lever fixed section to correspond to the fixed section and the mobile section of the Roberval's mechanism, with a clearance section interposed between the fixed side and the mobile side, the clearance section being formed by cutting a midway section in the longitudinal direction (L1) of the first metal block material in a predetermined shape, and wherein the fixed section and the mobile section formed on the base end section side of the lever are fixed to the fixed side and the mobile side of the lever fixed section.

4. An electronic balance according to claim 1, wherein the Roberval's mechanism further comprises a protruded piece having a predetermined length and formed at an upper end section of the fixed section to extend in the longitudinal direction (L1) of the first metal block material, and wherein the lever is fixed to the lever fixed section of the Roberval's mechanism with the free end portion of the lever located under the protruded piece of the Roberval's mechanism.

5. An electronic balance according to claim 1, wherein the Roberval's mechanism further comprises a stepped section for guiding which is formed in the lever housing section along the longitudinal direction (L1) of the first metal block material and wherein the lever is guided to the stepped section, when the lever is inserted into the opening of the lever housing section of the Roberval's mechanism and housed in the housing section.

6. An electronic balance according to claim 1, which further comprises balance driving means for controlling the lever such that the lever is balanced, the balance driving means being provided just under the protruded piece of the Roberval's mechanism and at the free end section of the lever, which is extended to the external position of the Roberval's mechanism after the lever is fixed to the lever fixed section of the Roberval's mechanism.

7. An electronic balance according to claim 1, which further comprises bridges which are provided between the fixed side and the mobile side of the lever, which fix and hold the fixed side and the mobile side of the lever, and which are cut off after the lever is fixed to the Roberval's mechanism.

8. An electronic balance according to claim 7, wherein cutting holes, which serve as guides to cutting off the bridges, are formed in the Roberval's mechanism in such a manner as to correspond to positions of the bridges of the lever.

9. An electronic balance according to claim 6, which further comprises:

position detection means for detecting a displacement amount of the lever, a fixed surface formed at the free end of the lever, and to which the balance driving means is fixed, a stepped surface formed at the free end of the lever and having a predetermined low step in a direction where the lever is displaced with respect to the fixed surface, a fixing member formed of metal different in kind from material of the lever for fixing the balance driving means and the position detection means with respect to the lever, wherein only the balance driving means is fixed to the fixed surface, and the position detection means is provided and fixed to the stepped surface.

10. An electronic balance according to claim 9, wherein a restricting member is provided and fixed to the stepped surface, and comprise restricting means for restricting a movement amount of the free end of the lever.

11. An electronic balance according to claim 1, wherein the lever includes a first reinforcement piece which protrudes and has a predetermined width in a width direction of the lever, a second reinforcement piece which protrudes and is continuous with the first reinforcement piece, and a weight slidably attached to the second reinforcement piece for balancing.

12. An electronic balance according to claim 1, which further comprises a restricting section provided between the fixed section and the mobile section of the Roberval's mechanism, formed as a clearance for restricting a moveable range of the mobile section.

13. An electronic balance according to claim 12, wherein the restricting section is formed by hollowing a single metal material block together with the Roberval's mechanism and a restricting clearance section restricts the moveable range of the mobile section.

14. A method for manufacturing an electronic balance, comprising:

preparing a Roberval's mechanism which includes a fixed section, a mobile section which is moved in a vertical direction with respect to the fixed section upon reception of a substance to be weighed, and a pair of upper and lower parallel Roberval's sections which link the fixed section and the mobile section; and preparing a lever which is provided separate from the Roberval's mechanism, the lever having one end, another end and fulcrums, the lever being located between the upper and lower parallel Roberval's mechanism, the other end of the lever being displaced via the fulcrum when said one end of the lever receives motion of the mobile section of the Roberval's mechanism, wherein preparing the Roberval's mechanism includes preparing a lever housing section which enables the lever to be inserted into the Roberval's mechanism in a longitudinal direction thereof, and to be located between the upper and lower parallel Roberval's sections, preparing the lever comprising:

forming a fixed section and a mobile section in the lever which contains fulcrums for ensuring a reduction amount of a predetermined force from one end section to a free end of the lever, forming a thin-wall spring section which links the fixed section and the mobile section of the lever, forming bridges for fixing and holding the fixed section and the mobile section of the lever between the fixed section and the mobile section of the lever, and cutting the bridges after fixing the lever to the Roberval's mechanism.

* * * * *

UNITED STATES PATENT AND TRADEMARK OFFICE
CERTIFICATE OF CORRECTION

PATENT NO.     : 6,693,245 B2
DATED          : February 17, 2004
INVENTOR(S)    : Hiroaki Watabiki It is certified that error appears in the above-identified patent and that said Letters Patent is hereby corrected as shown below:

Title page,
Item [73], Assignee, change "Anritsu Corporation, Tokyo (JP)" to -- Anritsu Industrial Solutions Co., Ltd., Atsugi-shi, Kanagawa (JP) --.

Signed and Sealed this

Eighth Day of November, 2005

JON W. DUDAS
*Director of the United States Patent and Trademark Office*